US012777331B2

(12) United States Patent
Karpiniec et al.

(10) Patent No.: US 12,777,331 B2
(45) **Date of Patent: *Oct. 27, 2026**

(54) LANDING PAGE REDIRECT WITH SYNCHRONIZED MINI-SERVERS

(71) Applicant: DittoLive Incorporated, San Francisco, CA (US)

(72) Inventors: Thomas Karpiniec, Lenah Valley (AU); Adam Brandon John Fish, Berkeley, CA (US)

(73) Assignee: Dittolive Incorporated, San Francisco, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 18/990,845

(22) Filed: Dec. 20, 2024

(65) Prior Publication Data

US 2025/0119742 A1 Apr. 10, 2025

Related U.S. Application Data

(63) Continuation of application No. 18/423,659, filed on Jan. 26, 2024, now Pat. No. 12,219,008, which is a (Continued)

(51) Int. Cl.
*H04W 12/088* (2021.01)
*H04L 41/04* (2022.01)

(Continued)

(52) U.S. Cl.
CPC ......... *H04W 12/088* (2021.01); *H04L 41/045* (2022.05); *H04L 41/12* (2013.01);

(Continued)

(58) Field of Classification Search
CPC ................ H04W 12/088; H04W 12/08; H04L 61/5007; H04L 41/045; H04L 41/12;

(Continued)

(56) References Cited

U.S. PATENT DOCUMENTS 6,810,527 B1 * 10/2004 Conrad ............. H04N 21/6193
725/77
8,176,520 B1 5/2012 Mitchell (Continued)

OTHER PUBLICATIONS

Dunning David: "What Is AP Isolation?," Sep. 19, 2018 (Sep. 19, 2018), pp. 1-3.

(Continued)

*Primary Examiner* — Clayton R Williams
(74) *Attorney, Agent, or Firm* — Workman Nydegger

(57) ABSTRACT

Techniques for redirecting a client device from a server to a mini-server are disclosed herein. Initially, the client device establishes a connection with the server. The server provides a landing page to the client device, where the landing page is programmed to include an element that, when selected, redirects the client device away from its connection with the server. In response to a selection of the element, the client device establishes a connection with the mini-server. The mini-server is part of a first local area network (LAN), and, as a result of switching networks, the client device is now a part of a second LAN. The two LANs are connected to one another via a network bridge. The mini-server is able to receive input from the client device and synchronize that input across other mini-servers in the first LAN in order to redundantly store the input.

20 Claims, 18 Drawing Sheets

Related U.S. Application Data continuation of application No. 18/095,952, filed on Jan. 11, 2023, now Pat. No. 12,074,941, which is a continuation of application No. 17/158,945, filed on Jan. 26, 2021, now Pat. No. 11,558,458, which is a continuation of application No. 17/074,213, filed on Oct. 19, 2020, now Pat. No. 10,931,753.

(60) Provisional application No. 63/078,456, filed on Sep. 15, 2020.

(51) Int. Cl.

| | |
|---|---|
| ***H04L 41/045*** | (2022.01) |
| ***H04L 41/12*** | (2022.01) |
| ***H04L 61/5007*** | (2022.01) |
| ***H04L 67/1001*** | (2022.01) |
| ***H04L 67/1029*** | (2022.01) |
| ***H04L 67/1095*** | (2022.01) |
| ***H04L 67/12*** | (2022.01) |
| ***H04L 67/568*** | (2022.01) |
| ***H04W 12/08*** | (2021.01) |

(52) U.S. Cl.

CPC ...... *H04L 61/5007* (2022.05); *H04L 67/1001* (2022.05); *H04L 67/1029* (2013.01); *H04L 67/1095* (2013.01); *H04L 67/12* (2013.01); *H04L 67/568* (2022.05); *H04W 12/08* (2013.01); *H04L 41/04* (2013.01)

(58) Field of Classification Search

CPC ............... H04L 67/1001; H04L 67/568; H04L 67/1029; H04L 67/1095; H04L 67/12

See application file for complete search history.

(56) References Cited

U.S. PATENT DOCUMENTS

| | | | | |
|---|---|---|---|---|
| 8,640,202 | B2 | 1/2014 | Roy | |
| 9,585,184 | B1 * | 2/2017 | Sheriff | H04W 76/15 |
| 11,108,862 | B2 | 8/2021 | Kistner | |
| 11,483,046 | B1 * | 10/2022 | Tsai | H04B 7/0626 |
| 11,593,098 | B2 | 2/2023 | Vincent et al. | |
| 2003/0045286 | A1 | 3/2003 | Taylor | |
| 2008/0270686 | A1 * | 10/2008 | Grannan | G06Q 30/02 711/113 |
| 2009/0070841 | A1 * | 3/2009 | Buga | H04B 7/18506 725/116 |
| 2010/0281100 | A1 | 11/2010 | Benco et al. | |
| 2010/0304739 | A1 | 12/2010 | Rooks et al. | |
| 2012/0052941 | A1 | 3/2012 | Mo | |
| 2014/0282860 | A1 * | 9/2014 | Efrati | H04W 12/37 726/1 |
| 2016/0080069 | A1 | 3/2016 | Horvitz et al. | |
| 2018/0123703 | A1 * | 5/2018 | Xu | B61L 27/70 |
| 2020/0068358 | A1 | 2/2020 | Macrae | |
| 2020/0216176 | A1 * | 7/2020 | Ma | H04W 4/48 |
| 2021/0037272 | A1 | 2/2021 | Ghessassi | |

OTHER PUBLICATIONS

International Preliminary Report on Patentability received for PCT Patent Application No. PCT/US2021/048610, mailed on Mar. 30, 2023, 14 pages.

International Search Report and Written Opinion received for PCT Patent Application No. PCT/US21/48610, mailed on Jan. 28, 2022, 22 pages.

Wikipedia, "Distributed database", May 16, 2020, pp. 1-2.

* cited by examiner

1200

LANDING PAGE REDIRECT WITH SYNCHRONIZED MINI-SERVERS

CROSS-REFERENCE TO RELATED APPLICATIONS

This application is a continuation of U.S. patent application Ser. No. 18/423,659 filed on Jan. 26, 2024 and entitled "LANDING PAGE REDIRECT WITH SYNCHRONIZED MINI-SERVERS," which is a continuation of Ser. No. 18/095,952 filed on Jan. 11, 2023 and entitled "LANDING PAGE REDIRECT WITH SYNCHRONIZED MINI-SERVERS," which issued as U.S. Pat. No. 12,074,941, which is a continuation of U.S. patent application Ser. No. 17/158,945 filed on Jan. 26, 2021, and entitled "LANDING PAGE REDIRECT WITH SYNCHRONIZED MINI-SERVERS," which issued as U.S. Pat. No. 11,558,458 on Jan. 17, 2023, which is a continuation of U.S. patent application Ser. No. 17/074,213 filed on Oct. 19, 2020, and entitled "LANDING PAGE REDIRECT WITH SYNCHRONIZED MINI-SERVERS," which issued as U.S. Pat. No. 10,931,753 on Feb. 23, 2021, and also claims the benefit of and priority to U.S. Provisional Patent Application Ser. No. 63/078,456 filed on Sep. 15, 2020, and entitled "LANDING PAGE REDIRECT WITH SYNCHRONIZED MINI-SERVERS," all of which applications are expressly incorporated herein by reference in their entirety.

BACKGROUND

Computers and computing technology have affected nearly every aspect of human life. For example, computers are used in the food industry, healthcare industry, manufacturing, and nearly every other industry. Computers are heavily utilized on commercial and private airplanes and other aircraft. One of the factors contributing to the ubiquity of computers and computing technology has been the fact that computers can share information very quickly using networking technology. Even though an airplane may be 35,000+ feet in the air, the airplane can be equipped to provide its passengers with a Wi-Fi connection to enable the passengers' client devices to connect to the Internet throughout much of the flight. Network connections can also be used to enable passengers to make food or drink-related purchases. For instance, a passenger can swipe a credit card to order a meal or beverage even while flying far above the earth. To accomplish this, airplanes are typically equipped with an on-board server that provides connections to the Internet.

Airplanes are typically subject to stringent regulations in each country where the airplanes operate. In the United States, the Federal Aviation Administration (FAA) issues numerous rules and regulations for controlling maintenance and other operations of an airplane. Due to regulations imposed on airplane equipment, which includes any on-board server that is integrated into the airplane, it can be difficult for airlines to install new server equipment on the airplane, and it is also often difficult to install new software or updates to existing software and equipment. Performing maintenance on the server is also burdensome and time consuming. These difficulties make it challenging to provide new or improved services to airline passengers using on-board servers. What is needed, therefore, is an improved technique for providing digital content and services to client devices in an airplane or aircraft environment without installing new on-board servers or installing new or updating on-board server software.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., mobile devices, wearable devices, hardware storage devices, etc.), and methods for providing a network topology that provides isolation between client devices connected to mobile/handheld mini-servers in a cluster (e.g., a group of mini-servers) while simultaneously providing bidirectional synchronization between the mini-servers in the cluster. In such embodiments, the mini-servers are not on-board servers integrated into the airplane. Consequently, the mini-servers are not subject to the regulation that typically applies to integrated equipment.

In some embodiments, the network topology includes a first network formed by a first set of connections between the servers in the cluster. The topology also includes one or more wireless access points (WAPs). The servers in the cluster are configured to perform bidirectional synchronization with one another. This bidirectional synchronization permits data stored at any one of the mini-servers in the cluster to be synchronized across one, some, or all of the mini-servers in the cluster.

The topology includes a second network formed by a second set of connections between the one or more WAPs mentioned above and client devices. The one or more WAPs provide isolation between the client devices within the second network. The topology further includes one or more network bridges that bridge the second network to the first network. Here, the client devices are connectable to the mini-servers in the cluster in the first network via the network bridges. The system providing the topology is configured to cause the mini-servers in the cluster to host content in the first network and to provide the content to the client devices in the second network via the network bridges. In some embodiments, in response to receiving (e.g., at a particular one of the mini-servers in the cluster) input from a particular one of the client devices, the system synchronizes the input across all the mini-servers in the cluster.

Some embodiments are configured to redirect a client device between different networks. To do so, there is a determination that the client device is connected to a first server (e.g., an onboard integrated airplane server) configured to provide access to a wide area network (WAN). The embodiments also determine that the first server has transmitted a landing page to the client device. Here, the landing page includes a selectable user interface option that, when selected, redirects the client device from being connected to the first server to being connected to a local area network (LAN) hosted by mini-servers in the cluster. Notably, the first server is excluded from the mini-servers in the cluster hosting the LAN. In response to a determination that the selectable user interface option has been selected at the client device, the embodiments select an Internet Protocol (IP) address from a range of IP addresses that are reserved for the mini-servers in the cluster hosting the LAN. Then, a second mini-server, which is included among the mini-servers in the cluster and whose IP address is the selected IP address, connects to the client device. Consequently, the client device is redirected from being connected to the first server to being connected to the second mini-server and the LAN. The embodiments also cause the second mini-server to transmit a webpage to the client device over the LAN. In response to receiving (e.g., at the second mini-server) input entered via the webpage at the client device, the embodiments synchronize the received input between the second mini-server and one or more other mini-servers in the cluster.

Some embodiments configure a first network by establishing a first set of connections between mini-servers in a cluster. These mini-servers are configured to perform bidirectional synchronization with one another to cause data stored at any one of the mini-servers in the cluster to be synchronized across one, some, or all of the mini-servers in the cluster. Furthermore, the first network is a first local area network (LAN). The embodiments also configure a second network by establishing a second set of connections between one or more wireless access points (WAPs) and one or more client devices. The WAPs provide isolation between each of connections within the second set of connections such that the client devices are isolated from one another within the second network. Here, the second network is a second LAN. Such embodiments also configure one or more network bridges that bridge the second LAN to the first LAN. As a result, the client devices are connectable to the mini-servers in the cluster on the first LAN via the one or more network bridges. Additionally, the embodiments provide a landing page to a particular client device that is connected to a particular server (e.g., an integrated onboard airplane server) configured to provide access to a wide area network (WAN). Notably, the particular server is not one of the mini-servers in the cluster in the first LAN. In response to received user input that is directed to a selectable user interface option included in the landing page, the embodiments redirect the particular client device from being connected to the particular server providing access to the WAN to being connected to one of the mini-servers in the cluster in the first LAN. Consequently, the particular client device is now included in the first LAN and is now connected to one of the mini-servers in the cluster in the first LAN via the one or more network bridges. The embodiments also cause the mini-server in the cluster in the first LAN to which the particular client device is connected to transmit a webpage to the particular client device over the one or more network bridges bridging the first LAN and the second LAN. Subsequently, in response to receiving input that was entered via the webpage at the particular client device and that was received over the one or more network bridges, the embodiments synchronize input received by the mini-server that transmitted the webpage across one or more other mini-servers in the cluster.

This Summary is provided to introduce a selection of concepts in a simplified form that are further described below in the Detailed Description. This Summary is not intended to identify all of the key features or essential features of the claimed subject matter, nor is it intended to be limiting in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
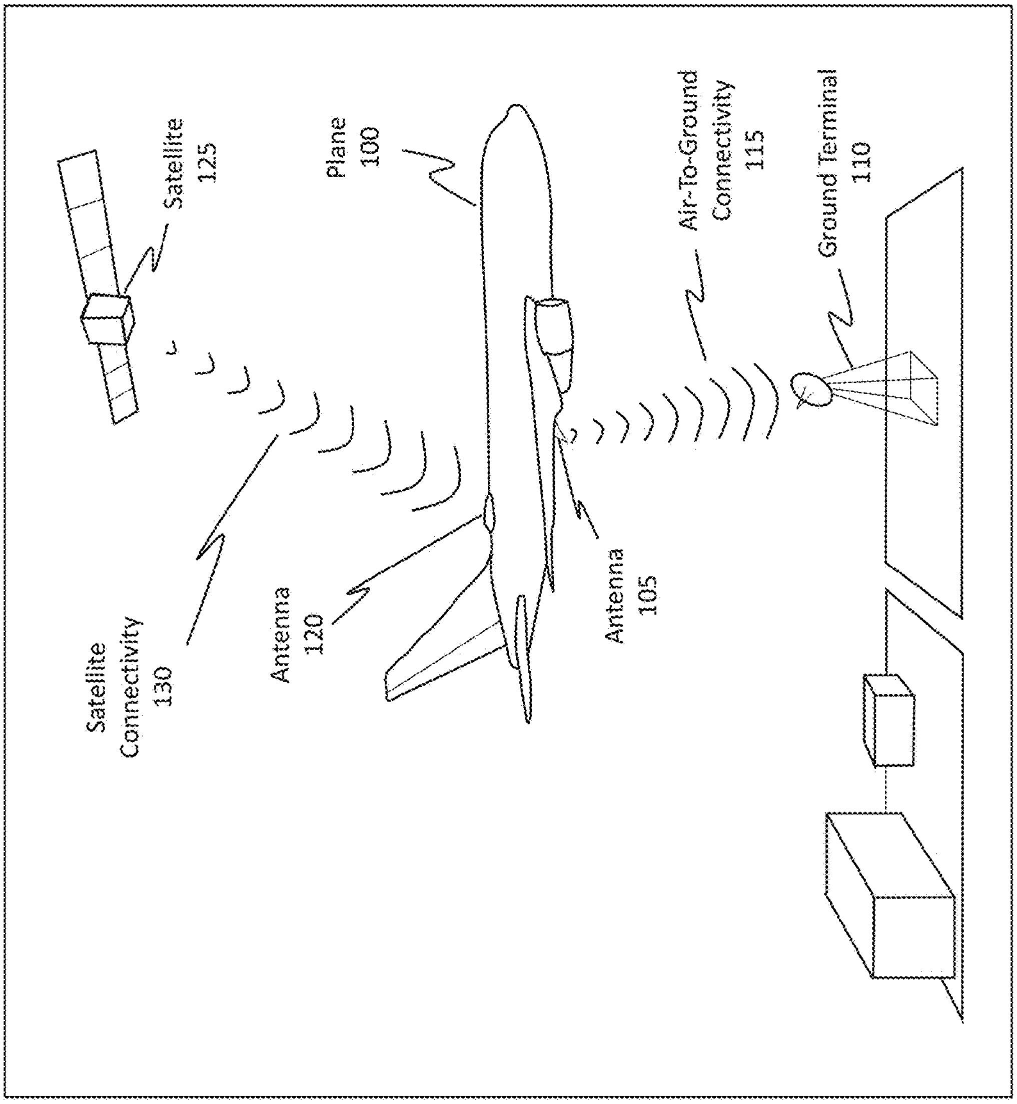
FIG. 1 illustrates a scenario in which an aircraft is able to connect to a ground-based terminal and/or a satellite in order to send and receive data. Using these connections, the aircraft is able to provide Wi-Fi connections to client devices located inside the aircraft.

Embodiments disclosed herein relate to systems, devices (e.g., mobile devices, wearable devices, hardware storage devices, etc.), and methods for providing a network topology that provides isolation between client devices connected to mobile/handheld mini-servers in a cluster while simultaneously providing bidirectional synchronization between the mini-servers in the cluster. In such embodiments, the mini-servers are not on-board servers integrated into the airplane. Consequently, the mini-servers are not subject to the regulation that typically applies to integrated equipment.

In some embodiments, the network topology includes a first network formed by connections between mini-servers. These mini-servers perform bidirectional synchronization with one another. The topology also includes a second network formed by connections between wireless access points (WAPs) and client devices. The WAPs provide isolation between the client devices. The topology further includes a network bridge that bridges the two networks. The client devices are connectable to the mini-servers via the bridges. The system providing the topology is configured to cause the mini-servers to host content in the first network and to provide the content to the client devices in the second network via the network bridges. In response to receiving (e.g., at a particular one of the mini-servers) input from one of the client devices, the system synchronizes the input across all the mini-servers.

Some embodiments are configured to redirect a client device between different networks. To do so, there is a determination that the client device is connected to a first server (e.g., perhaps an integrated onboard airplane server) configured to provide access to a wide area network (WAN). The embodiments also determine that the first server has transmitted a landing page to the client device. The landing page includes an option that, when selected, redirects the client device to a local area network (LAN) hosted by a cluster of mini-servers. Notably, the first server is excluded from the cluster hosting the LAN. In response to the option being selected, the embodiments select an Internet Protocol (IP) address from a range of IP addresses reserved for the mini-servers in the cluster. Then, a second mini-server, which is included among the cluster and whose IP address is the selected IP address, connects to the client device. Consequently, the client device is redirected from being connected to the first server to being connected to the second mini-server and the LAN. The embodiments also cause the second mini-server to transmit a webpage to the client device over the LAN. Input from the client device is then synchronized amongst the mini-servers in the cluster.

Some embodiments configure a first network by establishing connections between mini-servers in a cluster. These mini-servers perform bidirectional synchronization with one another. Furthermore, the first network is a first local area network (LAN). The embodiments also configure a second network by establishing connections between WAPs and client devices. The WAPs provide isolation between the client devices. The second network is a second LAN. The embodiments also configure a network bridge that bridges the second LAN to the first LAN. As a result, the client devices are connectable to the mini-servers in the cluster via the network bridges. Additionally, the embodiments provide a landing page to a client device connected to a particular server (e.g., perhaps an integrated onboard airplane server) configured to provide access to a wide area network (WAN). Notably, the particular server is not one of the mini-servers in the cluster. In response to received user input that is directed to a selectable user interface option included in the landing page, the embodiments redirect the client device from being connected to the particular server to being connected to one of the mini-servers in the cluster. Consequently, the client device is now included in the second network and is now connected to the cluster of mini-servers via the network bridge. The embodiments also cause the cluster mini-server to transmit a webpage to the client device over the network bridge. Subsequently, in response to receiving input that was entered via the webpage at the user device and that was received over the network bridge, the embodiments synchronize the received input across the mini-server and one or more other mini-servers in the cluster.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous benefits and improvements to the technical field. For instance, as described earlier, it is overly burdensome and difficult to maintain or update an airplane's on-board servers. In accordance with the disclosed principles, the embodiments avoid these difficulties and burdensome operations.

To achieve these benefits, the embodiments utilize battery-operated mobile mini-servers, such as tablets, smart phones, laptops, or any other Internet-of-Things (IoT) device. Notably, the crew members boarding the plane can use their mobile devices as mini-servers, as will be discussed in more detail later. Operating as a cluster of mini-servers, these mobile devices create a robust network topology for providing digital content to passengers on the plane while avoiding the burdens associated with one or more on-board servers. That is, the mobile devices can be organized as mini-servers in a cluster on a wireless network to provide services to passengers.

By following the disclosed principles, the costs of maintenance, repair, and updates are significantly reduced because the mobile mini-servers are not subject to the same restrictions, rules, and regulations as the one or more on-board servers. As a consequence, operations related to plane management and maintenance are substantially improved. For instance, it often takes many months to update the on-board servers of a fleet of planes. In contrast, it will take seconds or minutes to update the mobile mini-servers described herein.

The disclosed embodiments are focused on a new technique that effectively replaces the old technique of providing services on an airplane and that relies on mobile units that are not a part of the plane. These mobile units can be updated without having to follow the rules and regulations of a stringent regulatory body managing the affairs of the airline industry. Updating mobile devices is typically substantially easier than updating on-board servers and may be accomplished by flight crew rather than specially trained technical personnel. Accordingly, these and other benefits are provided by the disclosed embodiments.

Airplane Communications

Attention will now be directed to FIG. 1, which illustrates how an airplane is able to communicate with external sources in order to provide Internet connectivity to devices located within the airplane. Specifically, FIG. 1 illustrates a plane 100 that includes an antenna 105. Antenna 105 is shown as communicating with a ground terminal 110, as represented by the air-to-ground connectivity 115. Through this connection, the plane 100 can then provide an Internet connect to its internal devices as well as to client devices (e.g., passenger's phones, tablets, laptops, etc.).

Often, however, the plane 100 may be traveling over a large body of water or over a large expanse of land that does not have the ground terminal 110. In such scenarios, the plane 100 may use an antenna 120 to communicate with a satellite 125, as shown by the satellite connectivity 130. In this regard, the plane 100 can continue to provide Internet connections using the satellite connections.

Figure 2:
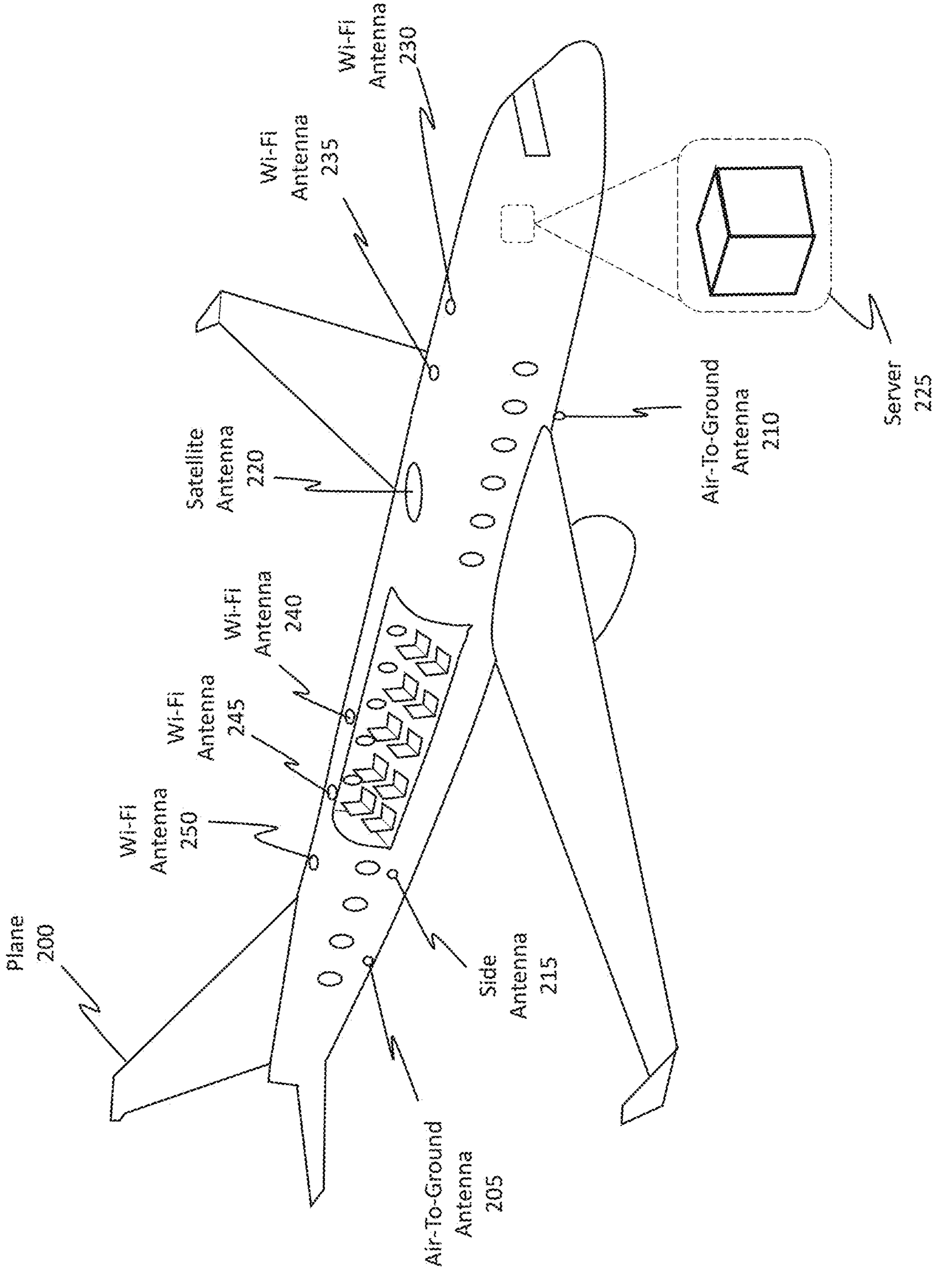
FIG. 2 illustrates some example hardware that is used to provide Wi-Fi connections to client devices located within an aircraft.

FIG. 2 provides additional clarification regarding how a plane can provide Internet connectivity to client devices. Specifically, FIG. 2 illustrates a plane 200, which is representative of the plane 100 from FIG. 1. Plane 200 is shown as including an air-to-ground antenna 205 and an air-to-ground antenna 210, both of which are representative of the antenna 105 from FIG. 1. Although only two of these types of antennas are illustrated, one will appreciate how the plane 200 may include any number of these types of antennas, without limit. Plane 200 also includes a side antenna 215 for communicating with other planes or devices that may be generally within the same lateral plane as the plane 200.

Plane 200 also includes a satellite antenna 220, which is representative of the antenna 120 from FIG. 1. Using this satellite antenna 220, the plane 200 is able to communicate with any number of satellites.

Plane 200 also includes an onboard server 225. The server 225 may be structured to provide any number of computer-related functionality for the plane. Furthermore, the server 225 is an integrated part of the plane 200. In some cases, the server 225 is able to utilize the air-to-ground antennas 205, 210, the side antenna 215, and even the satellite antenna 220 to establish an Internet connection. The server 225 may then provide access to this Internet connection via any number of wireless access points (WAPs), such as the Wi-Fi antennas 230, 235, 240, 245, and 250. Plane 200 may include any number of WAPs. Additionally, as shown in FIG. 2, the location of these WAPs may be distributed across the plane in order to provide strong signal strength for any device in the plane 200, regardless of that device's location.

Figure 3:
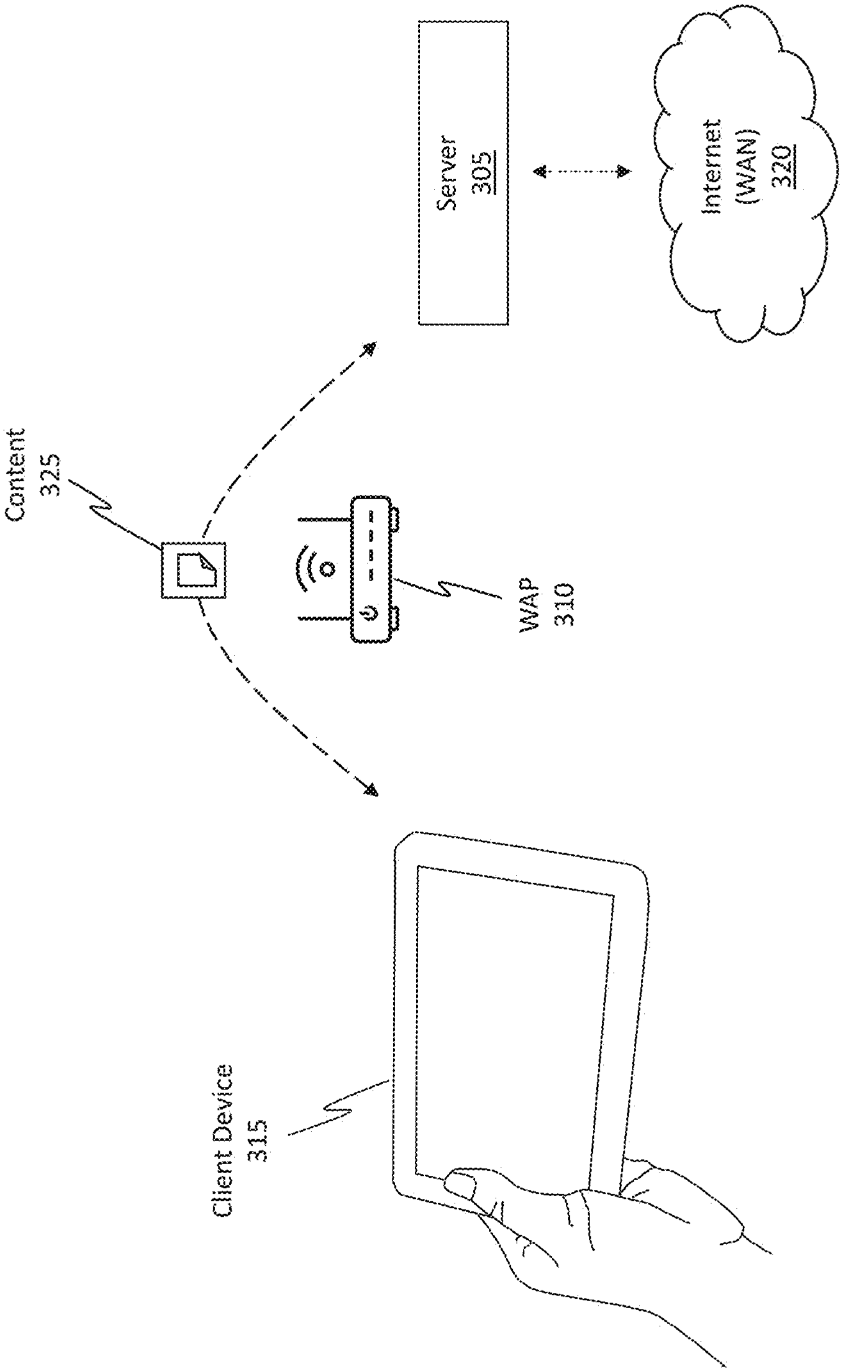
FIG. 3 illustrates an example architecture for connecting a client device to a server, which provides connections to the Internet, which comprises a wide area network (WAN).

FIG. 3 illustrates an example architecture 300 in which client devices are able to communicate with a server to obtain Internet access. The architecture 300 may be utilized by the plane 200 of FIG. 2. Specifically, the architecture 300 includes a server 305, which is representative of the server 225 from FIG. 2. The architecture 300 also includes a WAP 310, which is representative of any one of the Wi-Fi antennas 235, 240, 245, and 250 from FIG. 2. A client device 315 is also included in the architecture 300. The client device 315 may be any type of computing device, such as any type of smart phone, laptop, tablet, and so on, without limit. The client device 315 is an example of a device that passengers may have on the plane 200 of FIG. 2.

The architecture 300 is designed to enable the server 305 is connect to a wide area network (WAN), such as the Internet 320, using the antennas discussed thus far. Using the antennas and the WAP 310, the server 305 is able to access the Internet 320 and provide any type of content 325 to the client device 315. Accordingly, computing architectures utilized in planes or other aircraft are able to provide connections to the Internet using wireless connectivity.

Improved Architectures for Providing Wireless Content

Figure 4:
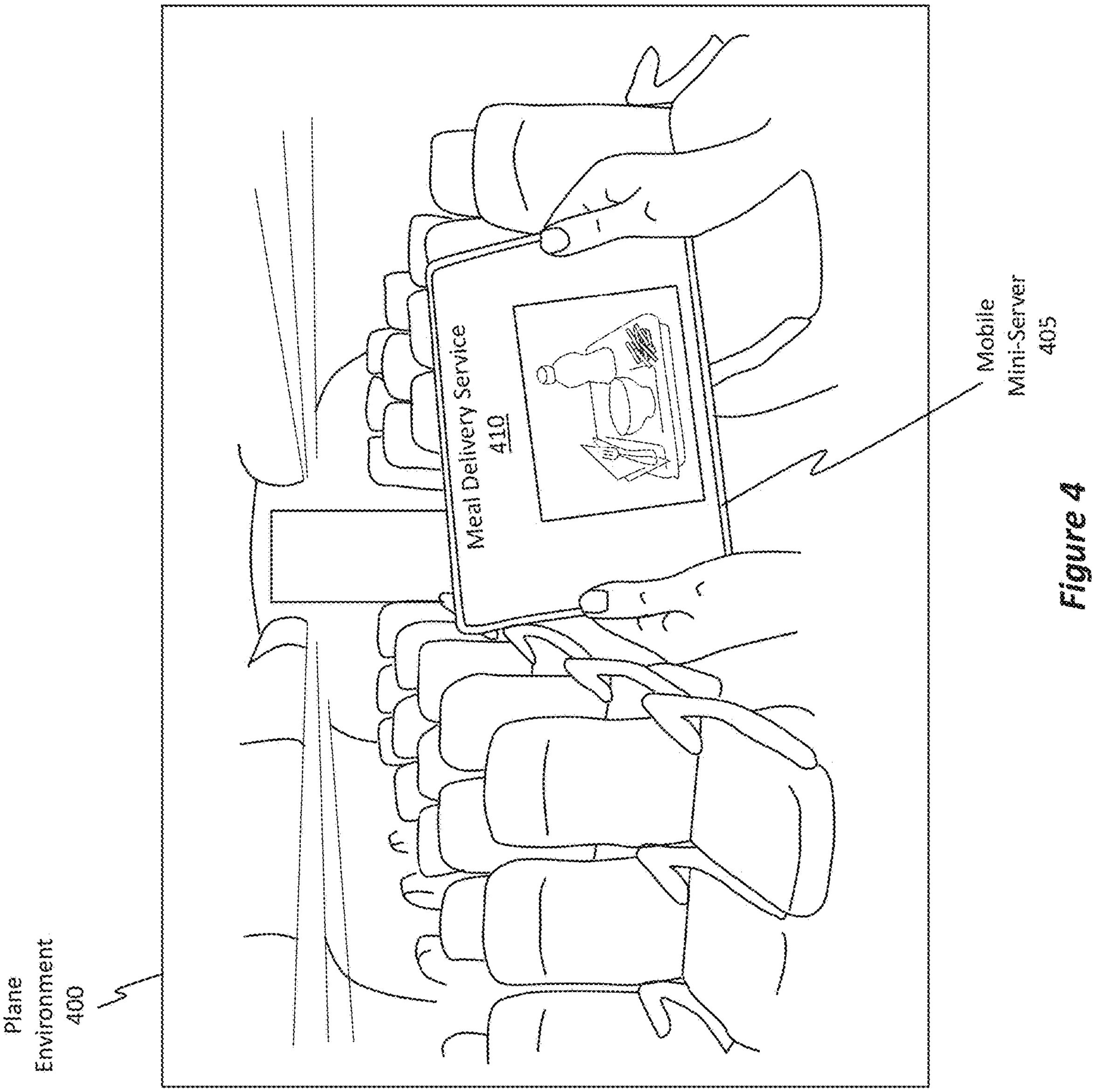
FIG. 4 illustrates an example scenario in which a battery-powered portable mini-server is now able to host content for client devices located within an aircraft.

In accordance with the principles disclosed herein, the embodiments are able to provide an improved network topology for providing wireless content to devices, especially devices located within an airplane that use different antennas (e.g., the air-to-ground antennas and satellite antennas) mentioned thus far to connect to the Internet. FIG. 4 provides a useful introductory illustration to depict this concept.

Figure 5:
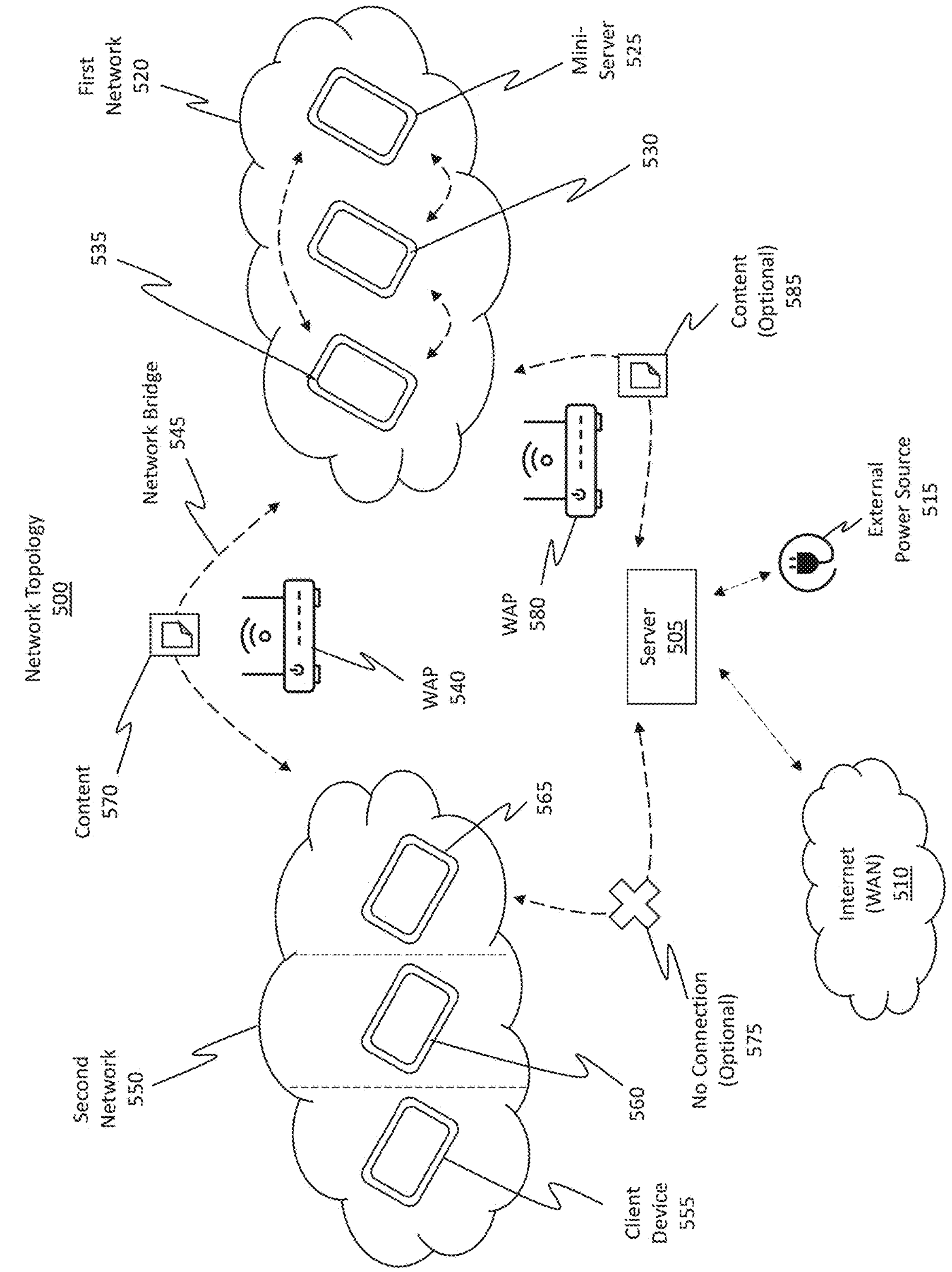
FIG. 5 illustrates an improved network topology for enabling mini-servers to host content for client devices within an aircraft and to enable those mini-servers to safely store data in a redundant manner using bidirectional synchronization.

Specifically, FIG. 4 shows a plane environment 400, which may be an environment within the confines of the plane 200 from FIG. 2 and which may provide access to the architecture 300 of FIG. 3. In accordance with the disclosed principles, however, the embodiments utilize a mobile mini-server 405 in order to host content and provide that content to client devices. As one example, the mobile mini-server 405 is able to provide a meal delivery service 410 to client devices (or a product delivery service or even a beverage delivery service). FIG. 5 provides an illustration regarding the improved network topology disclosed herein.

FIG. 5 illustrates an improved network topology 500 that may be incorporated within the plane environment 400 of FIG. 4. Specifically, the network topology 500 is shown as including an onboard server 505, which is representative of the server 305 from FIG. 3. Server 505 is able to provide access to a wide area network (WAN), such as the Internet 510. Additionally, the server 505 is an integrated part of a plane, such as the server 220 included in plane 200 of FIG. 2. Consequently, the server 505 receives power from an external power source 515, such as the plane 200. That is, while the server 505 may include a battery (e.g., for backup purposes in the event power is temporarily lost), the primary power source for the server 505 is the plane as opposed to a battery. Furthermore, the server 505 is typically not structured as a mobile device.

Network topology 500 also includes a first network 520 comprising any number of mini-servers, such as mini-server 525, 530, and 545. These mini-servers are representative of the mobile mini-server 405 from FIG. 4. Additionally, it is often the case that these mini-servers are mobile devices used by crew members of the plane. Additional details regarding these mini-servers will be provided later.

Network topology 500 also includes a WAP 540, which is representative of the WAP 310 from FIG. 3. Similar to the server 505, the WAP 540 is often implemented as an integrated part of the plane, as shown by the integrated Wi-Fi antennas illustrated in FIG. 2. The primary power source for the WAP 540 is also the plane, though the WAP may be temporarily powered by a battery as well. The WAP 540 is configured to provide a network bridge 545 between the first network 520 and a second network 550. Additional details regarding the network bridge 545 will be provided later.

The second network 550 includes any number of client devices that are located on the plane. As used herein, "client device" generally refers to any device used by a passenger, though crew and plane devices may possibly be included among the client devices. FIG. 5 illustrates the devices in the second network 550 as the client devices 555, 560, and 565. Although such client devices could be provided by the airline, in the embodiments described herein, client devices are owned by the passengers themselves. As an additional option, the client devices can download or otherwise use airline mobile applications to perform one or more of the disclosed operations.

The second network 550 is connected to the first network 520 via the WAP 540, which provides the network bridge 545. In this regard, the mini-servers in the first network 520 are able to host content and provide that content to the client devices, as represented by the content 570 being passed back and forth over the network bridge 545 between the first network 520 and the second network 550. To clarify, content can be passed from the first network 520 to the second network 550 and vice versa (e.g., from the second network 550 to the first network 520).

Notice, however, the second network 550 may, as an option, not be directly connected to the Internet 510, or rather to the server 505 which provides Internet connectivity, as shown by no connection 575. Instead, in some cases, if the client devices in the second network 550 request Internet content or services, it may be the case that the Internet content or services are indirectly provided to those devices via the mini-servers in the first network. For instance, the mini-servers in the first network 520 can utilize a WAP 580, which may be the same as WAP 540, to send and receive content 585 through the server 505 to the Internet 510.

Notice, content 585 is labeled "optional." In some cases, the mini-servers are able to receive content from the server 505 on the plane. In other cases, those mini-servers will download the content over the WAN before entering the plane and have it cached in memory of the mini-server. That is, the mini-servers are able to connect to the Internet before being brought on the plane and any type of data may be downloaded and stored on the mini-server. This downloaded content can then be provided to the client devices at a later point in time when the client devices are connected to one of the mini-servers, regardless of whether an Internet connection is established or available. Because the mini-servers are routinely synchronizing with one another, even though it may be the case that only one mini-server originally downloaded certain content, that content may be made available by all of the mini-servers.

Additionally, each respective mini-server may be tasked with downloading different content prior to boarding the plane in an effort to download as much diverse content as desired among all of the mini-servers. For instance, one mini-server may be tasked with downloading content "A", a different mini-server may be tasked with downloading content "B", and so forth. Later, content "A", "B", and so forth will then all be synchronized onto all the other mini-servers (or, in some cases, selective portions of data, but not all data, are synchronized). Consequently, no single mini-server was tasked with downloading all of the content; instead, the downloading task was distributed amongst the mini-servers, thereby improving (e.g., reducing) overall download times using a distributed workload. Once the mini-servers connect to the same network, then the content can be shared and distributed among all of the different mini-servers. In any event, the first network 520 is able to perform its operations even when no Internet connection is available or when no Internet connection is currently established. Further details on these aspects will be provided later.

Figure 6:
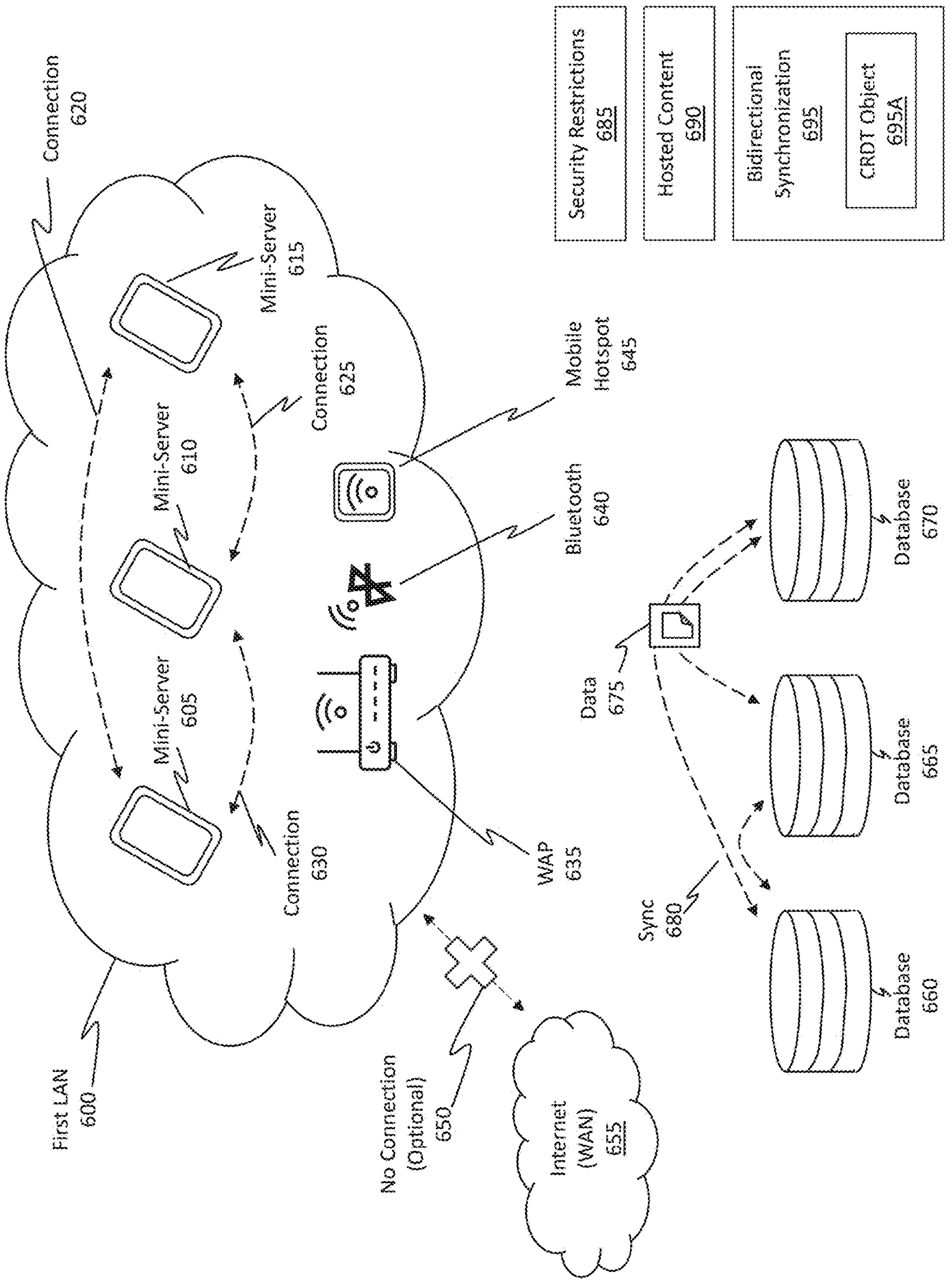
FIG. 6 illustrates an example of a first local area network (LAN) in which a cluster of mini-servers are able to synchronize data amongst themselves.
Figure 7:
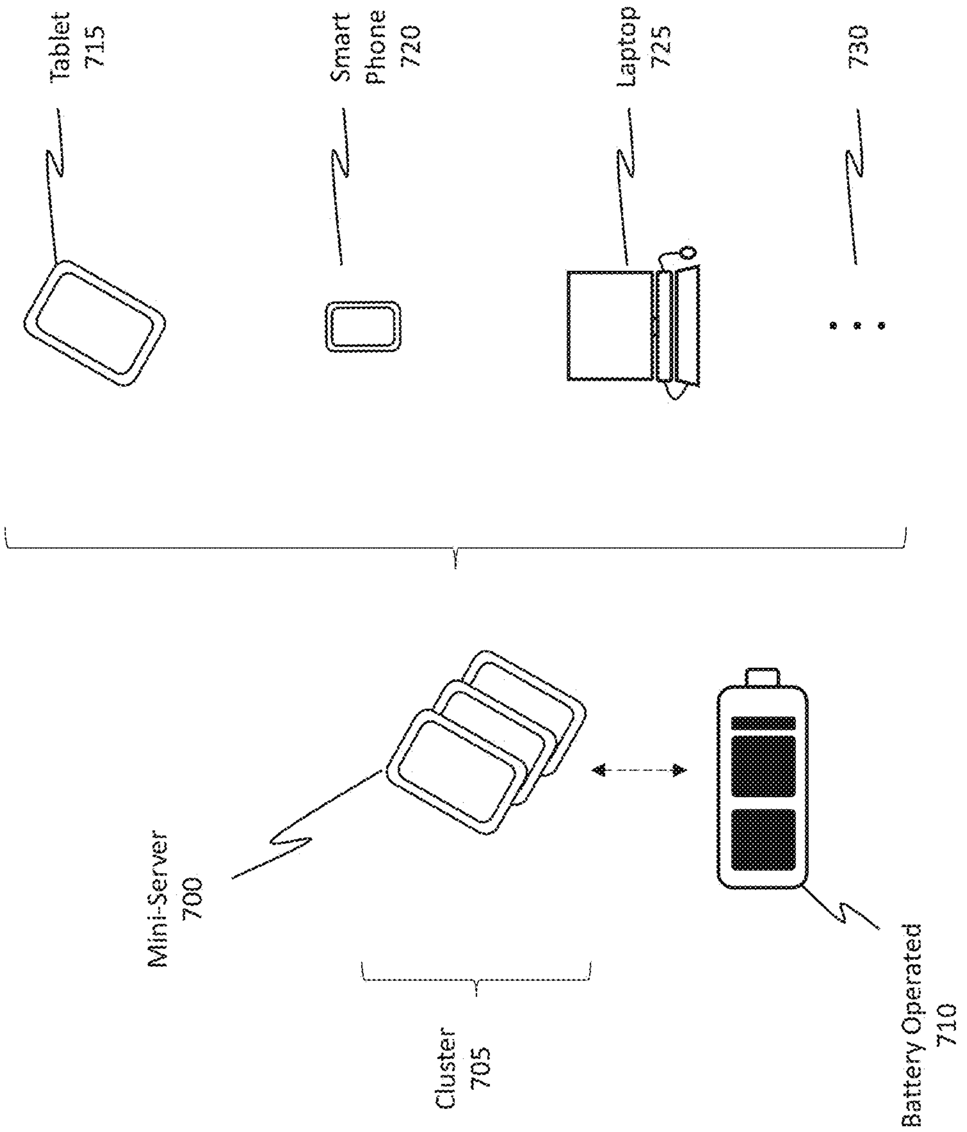
FIG. 7 illustrates different form factors and different implementations of a mini-server.
Figure 8:
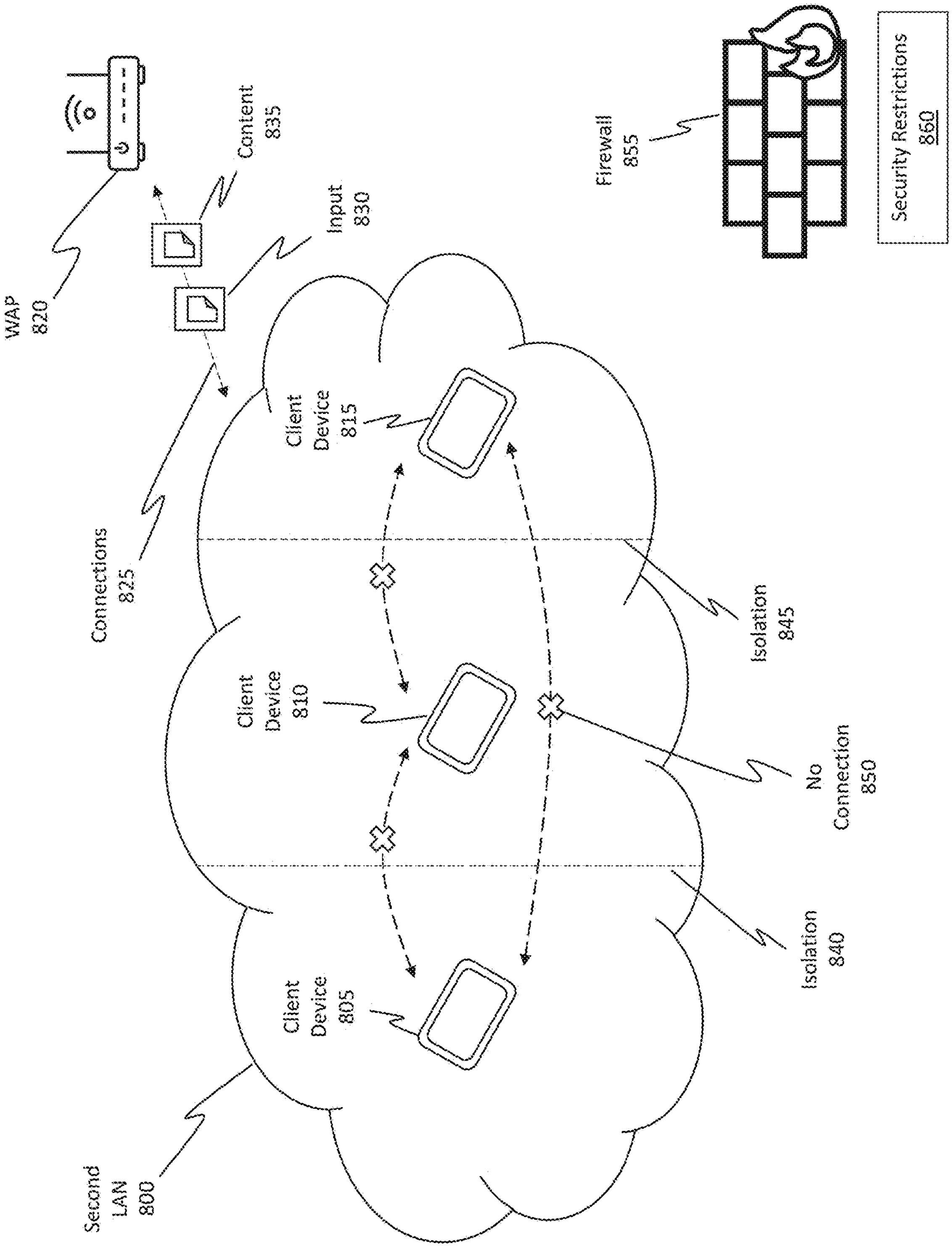
FIG. 8 illustrates an example of a second LAN used to connect multiple client devices to a wireless access point (WAP).
Figure 9:
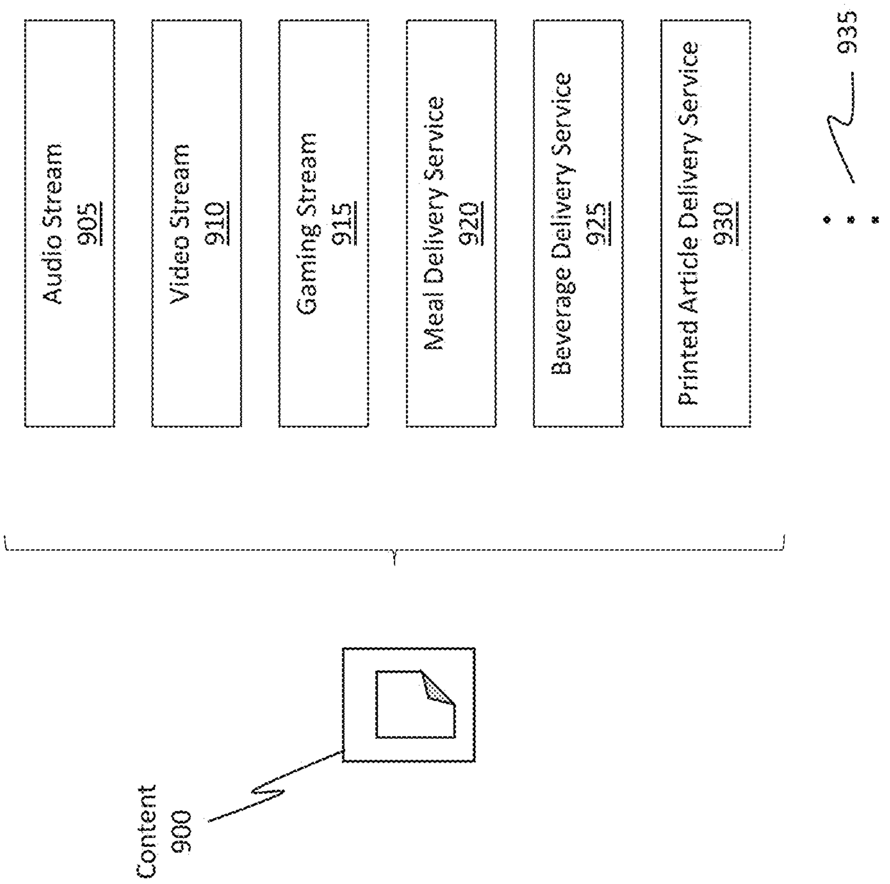
FIG. 9 illustrates how the mini-servers may host numerous different types of data and how that data may be provided to the client devices using the improved network topology.
Figure 10:
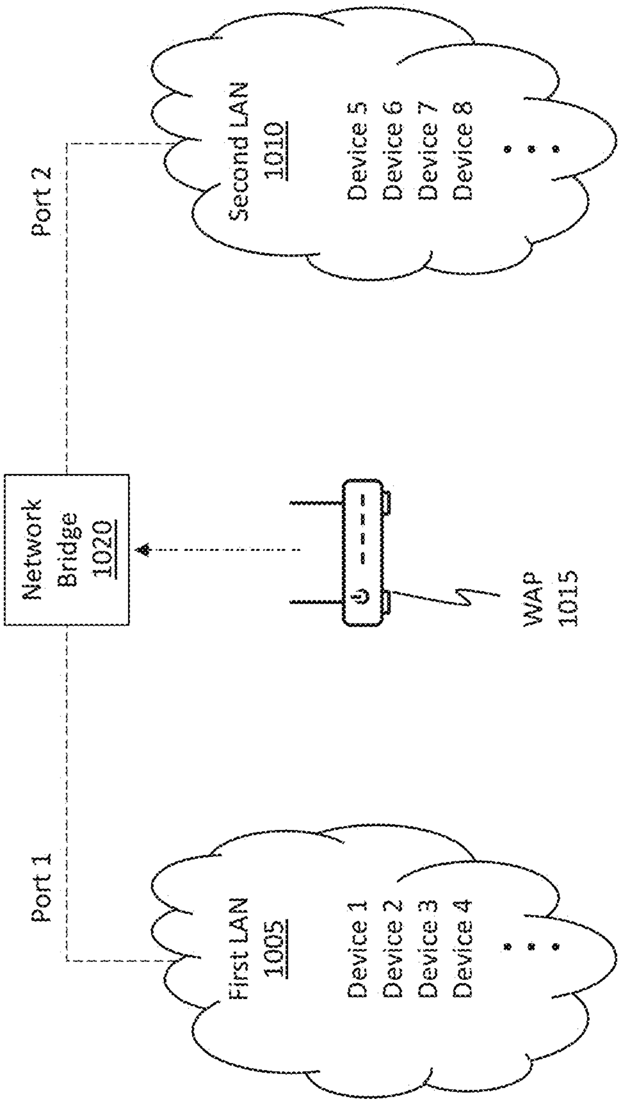
FIG. 10 illustrates how a network bridge can bridge the LAN of mini-servers with the LAN of client devices.
Figure 11:
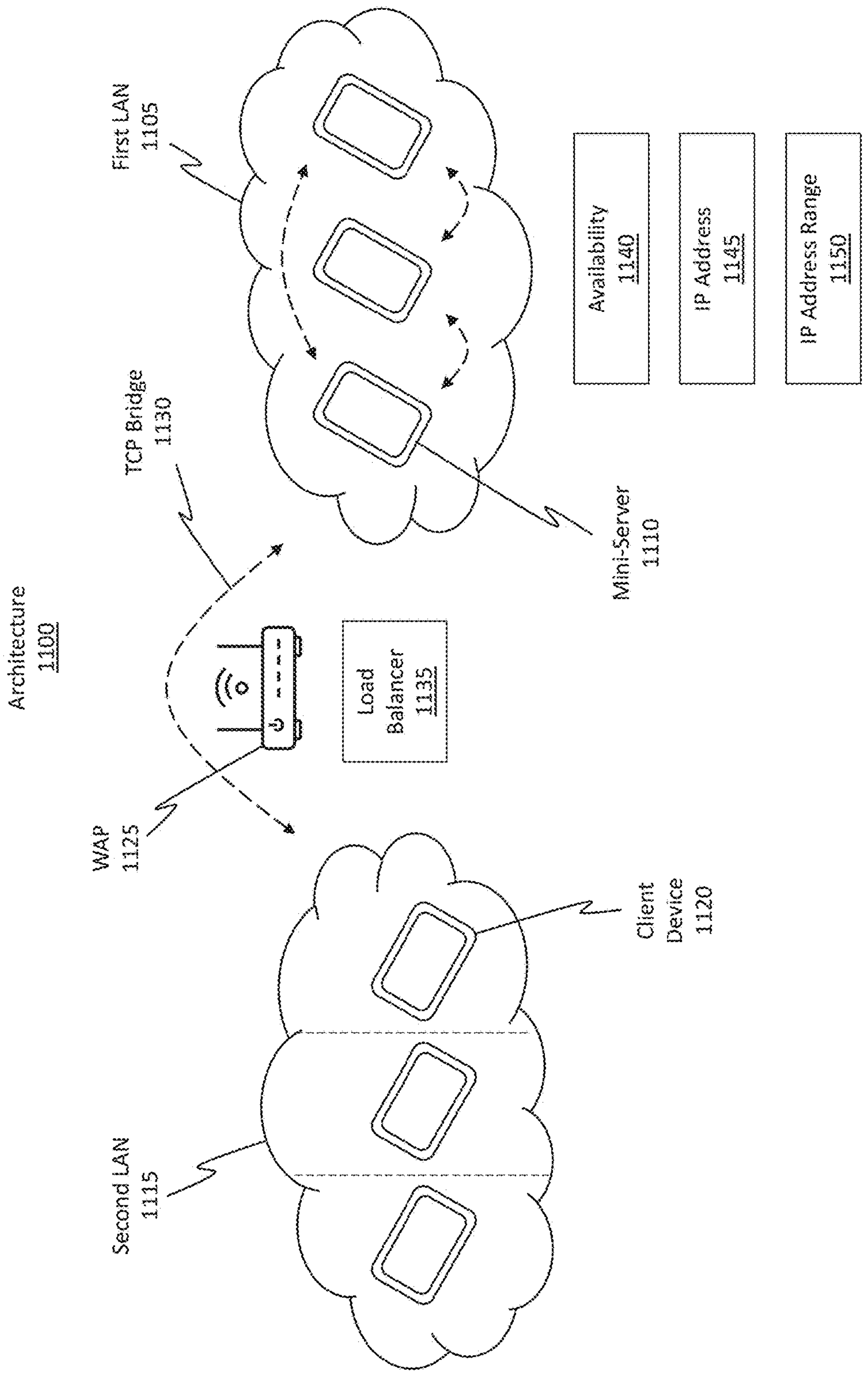
FIG. 11 illustrates how a load balancer is able to select one of the mini-servers to connect to a client device.

In some embodiments, the client devices may have a direct connection with the server 505 to access the Internet 510. As such, the no connection 575 feature is optional and is not a necessity. Accordingly, FIG. 5 illustrates the general network topology utilize by the disclosed embodiments. FIG. 6 provides a more detailed examination of the first network; FIG. 7 illustrates how the mini-servers may be structured; FIG. 8 provides a more detailed examination of the second network; FIG. 9 illustrates some example content that may be delivered to the client devices; FIG. 10 provides additional details regarding the network bridge; and FIG. 11 illustrates how the embodiments select a particular mini-server.

By having multiple mini-servers in the first network 520, the embodiments safeguard or protect against occurrences where a mini-server goes offline or loses power. In case such an event happens, the other mini-servers in the first network 520 can operate as failover devices and can continue to provide any requested services to a client device.

Mini-Server Network

FIG. 6 illustrates a first local area network LAN 600, which is representative of the first network 520 from FIG. 5. A local area network LAN is a computer network that connects multiple computing devices together within a limited geographic range and that often uses private telecommunication devices. In contrast, a wide area network WAN, such as the Internet, is a network of devices that covers a large geographic area and that often utilizes public telecommunication devices. In the disclosed examples, it is typically the case that the first LAN 600 does not provide access to the Internet, as will be discussed in more detail later.

The first LAN 600 is shown as including a mini-server 605, a mini-server 610, and a mini-server 615, which are representative of the mini-servers mentioned in FIG. 5. Turning briefly to FIG. 7, there is shown an example of a mini-server 700, which is representative of the mini-servers in FIG. 6. The collection or combination of multiple mini-servers constitutes a so-called cluster 705 of servers. Notice, the primary power source of the mini-server 700 is a battery, as shown by battery operated 710. That is, although the mini-server 700 may be plugged in to receive power and to charge its battery, it is typically the case that the mini-server 700 is not plugged in to an external power source.

FIG. 7 shows how the mini-server 700 may be structured in different ways. For instance, the mini-server 700 may be in the form of a tablet 715, a smart phone 720, or even a laptop 725. By way of example, the mini-server 605 from FIG. 6 may be the tablet 715 from FIG. 7, the mini-server 610 may be the smart phone 720, and the mini-server 615 may be the laptop 725. Of course, any combination or number of devices may be used as well. The ellipsis 730 illustrates how other form factors are considered as well, without limit. Typically, the mini-server 700 is a computer device provided or used by a member of the crew of the plane. Examples of crew members include, but are not limited to, flight attendants, maintenance personnel, the pilot or co-pilot, and so on. Accordingly, returning to FIG. 6, the mini-servers 605, 610, and 615 are typically devices used by a plane's crew team.

The first LAN 600 is formed by making any number of connections between the different mini-servers. For instance, FIG. 6 shows a connection 620 connecting mini-server 605 with mini-server 615; a connection 625 connecting mini-server 610 with mini-server 615; and a connection 630 connecting mini-server 605 with mini-server 610. These connections may be formed in various different ways.

For example, the connections 620, 625, and 630 may be formed by connecting the mini-servers using a WAP 635, which is representative of the WAP 540 from FIG. 5, the WAP 310 from FIG. 3, or any of the Wi-Fi antennas mentioned in FIG. 2. The connections may also be formed by connecting the mini-servers using any type of Bluetooth 640 connection or perhaps even using a mobile hotspot 645 connection (e.g., where one device acts as a mobile hotspot to connect to any number of other devices). In this regard, the connections may be formed by using an external connection mechanism (e.g., the WAP 635, which is external to any of the mini-servers) or an internal connection mechanism (e.g., Bluetooth, mobile hotspot, etc., which are internal devices or antennas used to connect mini-servers).

It is typically the case that the first LAN 600 does not provide Internet connectivity, as shown by no connection 650 to the Internet 655. If an Internet connection is desired, then the mini-servers utilize the server 505 from FIG. 5 to access the Internet. To clarify, it is typically the case that the mini-servers are not able to access the services or features of the air-to-ground antennas, side antennas, or satellite antennas illustrated in FIG. 2. Instead, the mini-servers rely on the server 225 from FIG. 2 to access those antenna connections to reach the Internet. Additionally, even when an Internet connection is available, the first LAN 600 does not depend on that connection in order to host and provide content to the client devices. As such, the first LAN 600 is able to perform its respective operations when i) an Internet connection is available and established between a mini-server and the server 505 from FIG. 5, ii) when an Internet connection is available but not established between a mini-server and the server 505, and/or iii) when no Internet connection is available or established between a mini-server and the server 505.

FIG. 6 also shows various different databases, such as database 660, database 665, and database 670. Database 660 is the database for mini-server 605; database 665 is the database for mini-server 610; and database 670 is the database for mini-server 615. Optionally, these databases may be the mini-servers' own filesystems. In accordance with the disclosed principles, the mini-servers 605, 610, and 615 are able to store, cache, or otherwise maintain data 675 and synchronize the data 675 on any one mini-server across all the other servers, as shown by sync 680.

A first set of security restrictions 685 are utilized for the first LAN 600 to enable cross communications between the different mini-servers to enable those servers to host content (e.g., as shown by hosted content 690) and to ensure the content is redundantly stored in a safe manner. In this regard, the mini-servers are able to perform bidirectional synchronization 695 with one another. In some cases, the bidirectional synchronization process may utilize a conflict-free replicated data (CRDT) object 695A to perform the data merge and synchronization. As a result of using the CRDT object 695A, the data 675 can be replicated across the different mini-servers in an independent and concurrent manner, without relying on coordination between the copies or replicas. Therefore, in some cases, the bidirectional synchronization 695 may be performed using CRDT objects (e.g., CRDT object 695A) to merge data across the mini-servers in the cluster (e.g., the mini-servers 605, 610, and 615).

Accordingly, the first LAN 600 is formed by a first set of connections (e.g., connections 620, 625, and 630) between the mini-servers in the cluster (e.g., mini-servers 605, 610, and 615). These mini-servers in the cluster are configured to perform bidirectional synchronization with one another to cause data stored on any one of the mini-servers in the cluster to be synchronized across one, some, or all of the mini-servers in the cluster.

Client Device Network

Attention is now directed to FIG. 8, which illustrates a second LAN 800. Second LAN 800 is representative of the second network 550 of FIG. 5. Similar to the first LAN 600 of FIG. 6, the second LAN 800 is also a local area network, as described in the manner recited earlier.

The second LAN 800 includes any number of client devices, including client device 805, client device 810, and client device 815. Additionally, the second LAN 800 relies on a WAP 820, which is representative of any of the WAPs discussed thus far. Here, each client device establishes a corresponding connection with the WAP 820. For instance, client device 805 has established a connection with the WAP 820; client device 810 has established a connection with the WAP 820; and client device 815 has established a connection with the WAP 820. The combination of the connections between the client devices and the WAP is illustrated via connections 825 in FIG. 8. In this regard, the second LAN 800 is formed by the WAP 820 establishing connections with each of the different client devices.

The client devices are able to send input 830 to the WAP 820 and receive content 835 from the WAP 820. The input 830 and the content 835 are representative of the content 570 in FIG. 5, where the content 570 is being passed back and forth between the first network 520 and the second network 550 via the network bridge 545 initialized by the WAP 540. One will appreciate how both the second LAN 800 of FIG. 8 and the first LAN 600 of FIG. 6 are able to utilize the same wireless hardware provided by the airplane. For instance, the WAP 820 of FIG. 8 may be the same WAP 635 in FIG. 6. Additionally, any number of wireless connections may be established.

Turning briefly to FIG. 9, this figure illustrates content 900, which is representative of either one of the input 830 transmitted by the client devices to the WAP 820 or the content 835 received by the client devices. Content 900 is also representative of the content 570 from FIG. 5. As used herein, content 900 may be any type of digital content, without limit. Examples of digital content include, but certainly are not limited to, an audio stream 905, a video stream 910, a gaming stream 915 or application, a meal delivery service 920, a beverage delivery service 925, or a printed article delivery service 930. Any other type of digital content, stream, data, or information may be included in the content 900. Indeed, the ellipsis 935 represents how any type of digital content may be transmitted between the client devices in the second LAN and the mini-servers in the first LAN.

Returning to FIG. 8, the WAP 820 configures the second LAN 800 in a secured manner to provide isolation between each of the different client devices. In some embodiments, isolation prevents files and content on one client device not to be accessible to another client device absent specific authorization. This isolation is illustrated in FIG. 8. For instance, isolation 840 reflects the isolation provided by the WAP 820 between client device 805 and client device 810. Similarly, isolation 845 reflects the isolation provided by the WAP 820 between client device 810 and client device 815. Notice, the no connection 850 indication reflects how the client devices are not able to access the files or content on another client device in the second LAN 800 as a result of the isolation provided between the client devices by the WAP 820. The isolation is able to provide data protection and authentication for the different client devices.

In this regard, the WAP 820 is establishing a firewall 855 between the different client devices. This firewall 855 implements a set of security restrictions 860 used to manage the second LAN 800. Notice, the security restrictions 860 are different than the security restrictions 685 of FIG. 6. That is, whereas the mini-servers in the first LAN 600 of FIG. 6 are able to communicate with one another and synchronize data, the client devices in the second LAN 800 of FIG. 8 are prevented from performing similar operations.

By way of additional clarification, the network bridge and the WAP 820 provide a firewall 855 between the first network (LAN) and the second network (LAN). Notably, a first set of security restrictions (e.g., security restrictions 685 from FIG. 6) are imposed on the first network and a second set of security restrictions (e.g., security restrictions 860 from FIG. 8) are imposed on the second network. Furthermore, the WAP 820 is able to provide the network bridge between the first network and the second network such that the WAP is the entity that provides the firewall 855.

Accordingly, the second LAN 800 of FIG. 8 is formed by a set of connections (e.g., connections 825) between the WAP 820 (or any number of WAPs) and the client devices (e.g., client devices 805, 810, and 815). The WAP 820 provides isolation (e.g., isolation 840 and 845) between the connections 825 such that the client devices are isolated from one another within the second LAN 800.

Network Bridge And Load Balancing

FIG. 10 illustrates an example architecture 1000, which is representative of the network topology 500 of FIG. 5 and which provides additional details regarding the network bridge 545 of FIG. 5. Architecture 1000 is shown as including a first LAN 1005 and a second LAN 1010, which are representative of the first LAN 600 of FIG. 6 and the second LAN 800 of FIG. 8, respectively. The first LAN 1005 includes any number of devices, or rather mini-servers, and the second LAN 1010 includes any number of client devices. Situated between the first LAN 1005 and the second LAN 1010 is a WAP 1015, which is representative of the WAP 540 from FIG. 5. The phrase "situated between" is not a phrase reflective of physical location; rather, it is a phrase reflective of the WAPs logical or networked position between the two different LANs in view of the network topology. Notice, the first LAN 1005 is an independent network, and the second LAN 1010 is a second, different network. The WAP 1015 operates to provide a network bridge 1020 between these two LANs.

In some embodiments, the network bridge 1020, connects two or more networks or network segments together and helps regulate traffic. The network bridge 1020 operates as a node in the network topology but does not generate any traffic of its own (unlike the nodes of the client devices and mini-servers). Often, network bridges operate at the data link layer and inspect traffic to determine where to route that traffic to, or perhaps to even filter the traffic. In some embodiments, the network bridge 1020 is implemented as a transmission control protocol (TCP) bridge. A TCP bridge enables data to be transmitted from one physical or virtual port of a computer system to a physical or virtual port of another computer system, such as from a client device to a mini-server or vice-versa (e.g., from Port 1 in FIG. 10 to Port 2). Other types of bridges or even network switches may also be used to implement the connection between the first LAN 1005 and the second LAN 1010.

Accordingly, the disclosed network topology includes one or more network bridges (e.g., network bridge 1020). These bridges bridge the second network (e.g., second LAN 1010) to the first network (e.g., first LAN 1005) such that the client devices in the second LAN 1010 are connectable to the mini-servers in the cluster via the network bridges.

FIG. 11 illustrates an example architecture 1100, which is representative of the architecture 1000 from FIG. 10. That is, architecture 1100 includes a first LAN 1105, comprising any number of mini-servers (e.g., mini-server 1110), and a second LAN 1115, comprising any number of client devices (e.g., client device 1120). Bridging the first LAN 1105 to the second LAN 1115 is the WAP 1125, which executes or provides the TCP bridge 1130.

In some, though not necessarily all implementations, the embodiments are able to utilize a load balancer 1135. The load balancer 1135 may be implemented as a part of the WAP 1125 or as a node within the first LAN 1105 or perhaps even the second LAN 1115. The load balancer 1135 operates to efficiently direct traffic across a group of servers, such as the mini-servers in the first LAN 1105. That is, the load balancer 1135 is logically positioned within the architecture between the client devices and the mini-servers. The load balancer 1135 receives traffic from the client devices and intelligently directs that traffic to the mini-servers in the first LAN 1105. Often, the load balancer 1135 directs traffic based on the determined availability 1140 of each mini-server. For instance, suppose a first mini-server is currently busy handling requests and content requested by a first client device. Now, suppose a second device submits a request. Because the first mini-server is currently busy (i.e. not available, or having an availability falling below a threshold level of availability), the load balancer 1135 directs that request to a second mini-server in the first LAN 1105. By balancing the load amongst the different mini-servers, no one mini-server will be overburdened or bogged down by too many requests.

In some implementations, the load balancer 1135 is not a separate system or entity. For instance, in some implementations, the load balancer 1135 is a mixture or combination of tasks performed by the mini-servers and/or the client devices. Optionally, the load balancer 1135 could be implemented using the onboard integrated server.

By way of example and not limitation, when a client device receives an IP address range for selecting a mini-server (additional details on this feature will be provided later), that client device first performs a random scan to find a working mini-server having an IP address within the specified range. However, once the client device redirects and connects to the selected mini-server, that mini-server can share the IP address for all the mini-servers because they are synchronizing with each other. The client device can then cache the list of working IP addresses included in the range and then, perhaps in response to a condition in which the client device needs to reconnect to the first LAN 1105, the client device can skip the previously performed scan because the client device has retained, or rather cached, the range of IP addresses.

The above operations describe a scenario in which the load balancing tasks are primarily performed by a client device. That being said, the load balancing tasks may additionally or alternatively be performed by the mini-servers. For instance, the mini-servers include functionality for load balancing client connections or client devices. To illustrate, in response to an incoming request from a client device, a particular mini-server can evaluate its own load and the known load (synchronized) from other mini-servers. That mini-server may then issue a redirect request back to the client to tell the client to instead connect to a different mini-server having a lower load at the current point in time.

Accordingly, in some implementations, though not necessarily all, the load balancer may not be a specific entity included within the architecture or network topology. Instead, the load balancing operations are performed by a set of tasks that the client devices and/or mini-servers perform.

One potential reason for implementing load balancing operations in the above manner is that running a separate load balancer process in the WAP 1125 may not be available or it may be overly difficult to set up, such as in scenarios where the hardware of the WAP 1125 is maintained by a different vendor or in scenarios where the WAP 1125 is subject to the same restrictions as the on-board server. That being said, in a case where the WAP 1125 does have some built-in load balancing features, the embodiments are able to take advantage of those features. Furthermore, if the WAP 1125 supported "dynamic DNS" the mini-servers could use that supported feature to update the WAP 1125 routing table for the IP addresses in the DNS entries dynamically to perform load-balancing operations.

That is, when "dynamic DNS" is supported, the mini-servers can elect a leader dynamically based on load and through a Dynamic DNS API call to the WAP to update the IP address for the domain/URL the client devices use to connect to. In such scenarios, a landing page redirect may not be performed (which will be discussed in more detail later) because the client devices now know the domain (e.g., “meal-order.my-airline.com”), and the router would be able to route to the IP address that was most recently updated by the mini-servers as the leader. Further discussion on landing page redirects will be provided later.

To recap, in some embodiments, the load balancer is a series of tasks that the client device and/or the mini-servers perform. The client devices can learn all of the IP addresses from a mini-server once the client device has connected to at least one mini-server. This allows the client device to redirect itself to another mini-server as needed. Additionally, or alternatively, the mini-servers are continually synchronizing with each other, thereby enabling those mini-servers to share their IP addresses amongst themselves and to load information with each other. As a result, each mini-server can decide to redirect a client connection to another mini-server as needed.

Each mini-server has its own corresponding IP address 1145. Notably, however, the disclosed embodiments arrange or configure the IP addresses of the mini-servers to fall in or be included within a predetermined range of IP addresses, as represented by the IP address range 1150. In some cases, the embodiments automatically cause the mini-servers to dynamically change their original IP addresses to a new IP address that falls within the IP address range 1150.

For instance, suppose a crew member is bringing his or her tablet onto a new plane. The tablet is able to connect to the onboard server and determine it is now being used on this new plane. As a part of that connection process, the embodiments may cause the tablet to automatically switch IP addresses (e.g., perhaps the tablet was previously connected to one network but is now attempting to connect to another network). As a corollary, the IP address is a property for each network that a device is connected to. If a device is connected to no networks, it may be the case that the device currently has no IP address. If the device is connected to 3G, 4G, 5G, etc. cellular Internet plus a Wi-Fi network, the device may potentially have one IP address for each network. In some cases, for handheld devices, those devices would connect to a Wi-Fi network and request an IP address from the local infrastructure (e.g., a DHCP server) rather than nominating their own IP address.

In any event, whereas the tablet’s original IP address may not have been one that fell in the IP address range 1150, the embodiments are able to trigger the tablet to dynamically change its IP address to a new one that does fall within the IP address range 1150. This dynamic change may be triggered each time a mini-server connects to a plane’s onboard server. In some cases, this dynamic change may be triggered based on the determined geographic location of the mini-server, as determined by a GPS used by the mini-server. For instance, if the tablet determines it is now located at an airport, as determined by the GPS, then the tablet may be configured to automatically switch IP addresses. Furthermore, if it is desirable to have the mini-servers stay within a certain range of addresses, this range can be configured on the DHCP server that hands them out (often a function of the WAP), rather than on the devices themselves.

In some cases, the dynamic switch may be triggered in response to the tablet being switched to an airplane mode in which the cellular, Wi-Fi, and Bluetooth functions are turned off. In some cases, the dynamic switch is triggered when the airplane mode is turned off, such that the cellular, Wi-Fi, and Bluetooth features are turned back on. It is often the case that airlines require mobile devices to have their airplane modes temporarily turned on while the plane is taxiing and approaching cruising altitude. Accordingly, switching the airplane mode on or off may operate as a trigger for causing the mini-server to switch its IP address. Further details as to why the IP address range 1150 is used will be provided later.

Techniques for Redirecting Client Devices to the Second LAN

Figure 12:
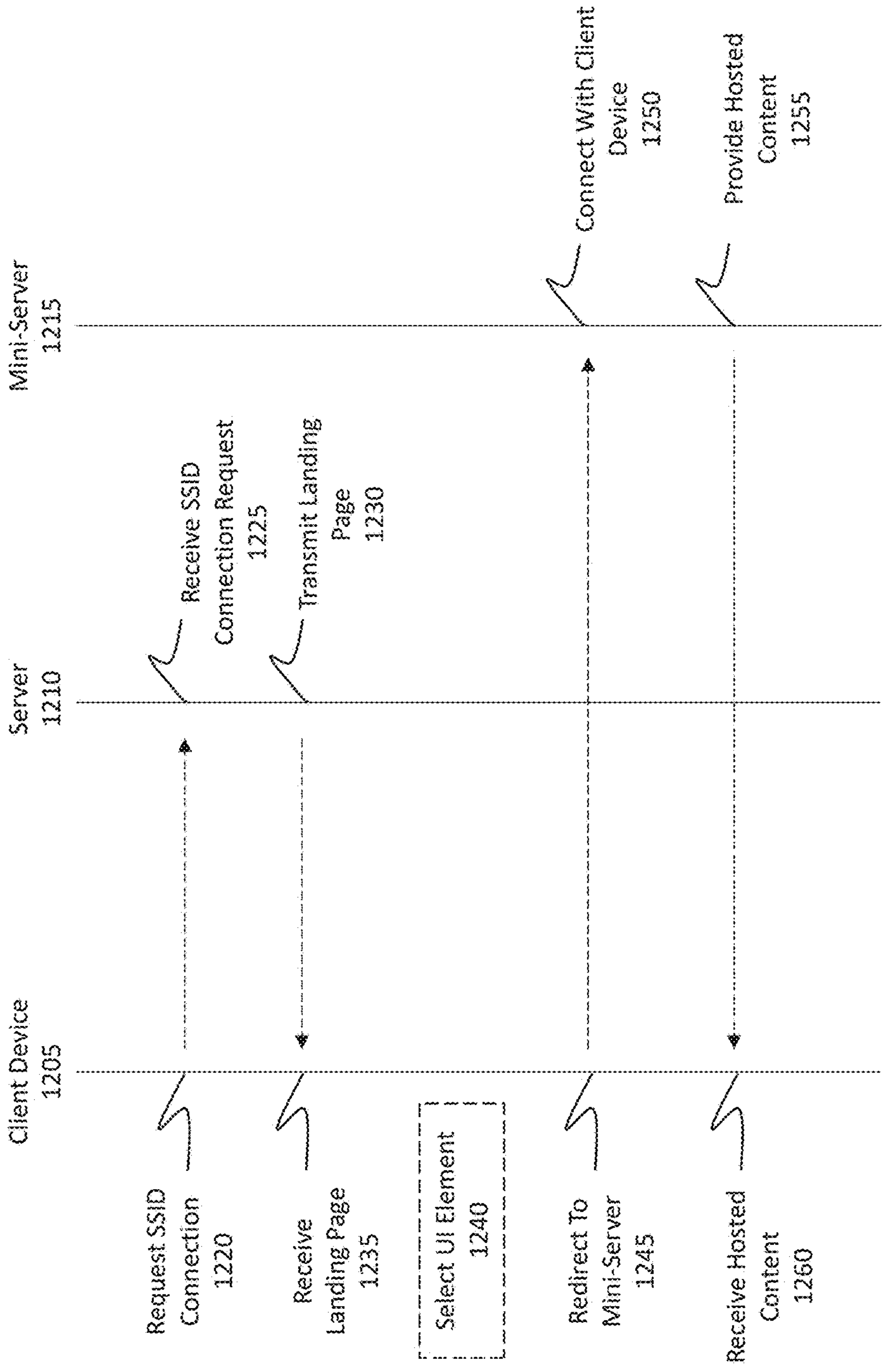
FIG. 12 illustrates a flowchart of an example process for redirecting a client device from an aircraft's integrated server to a mini-server.

Having just described various features of the improved network topology utilized by the disclosed embodiments, attention will now be directed to FIG. 12, which illustrates a flowchart 1200 of an example process to enable client devices to be directed to join the second LAN mentioned earlier. The flowchart 1200 shows three separate actors, namely, a client device 1205, a server 1210, and a mini-server 1215. The client device 1205 is representative of any of the client devices mentioned thus far, including client device 1120 of FIG. 11, the client devices of FIG. 8, the client devices of FIG. 5, and so on. The server 1210 is representative of the server 505 of FIG. 5, the server 305 of FIG. 3, and the server 225 of FIG. 2. The mini-server 1215 is representative of any of the mini-servers mentioned thus far.

Some embodiments disclosed herein utilize a webpage to send and receive content between the client devices and the mini-servers. Web browsers, which load the webpage, are typically not provided with the ability to discover other devices, such as the mini-servers. For instance, when a client device first attempts to connect to a plane’s Wi-Fi network, a landing page is typically transmitted to the client device and displayed for the user to view. Through this landing page, the user of the client device can select among different purchase options in order to utilize the plane’s Wi-Fi. In this regard, the client device can connect to the plane’s onboard server, but it is desirable to enable the client device to connect to the mini-servers described herein. Accordingly, FIG. 12 outlines an example process for redirecting a client device from the plane’s onboard server to any one of the mini-servers described herein.

Initially, the flowchart 1200 illustrates an act 1220 in which the client device 1205 is requesting a service set identifier (SSID) connection. In other words, the client device 1205 is requesting to join the plane’s Wi-Fi network. The server 1210, in act 1225, receives the SSID connection request. In response to that request, the server 1210 (in act 1230) transmits a landing page to the client device 1205. The client device 1205 receives that landing page (act 1235) and uses a web browser to display the web landing page.

Figure 13:
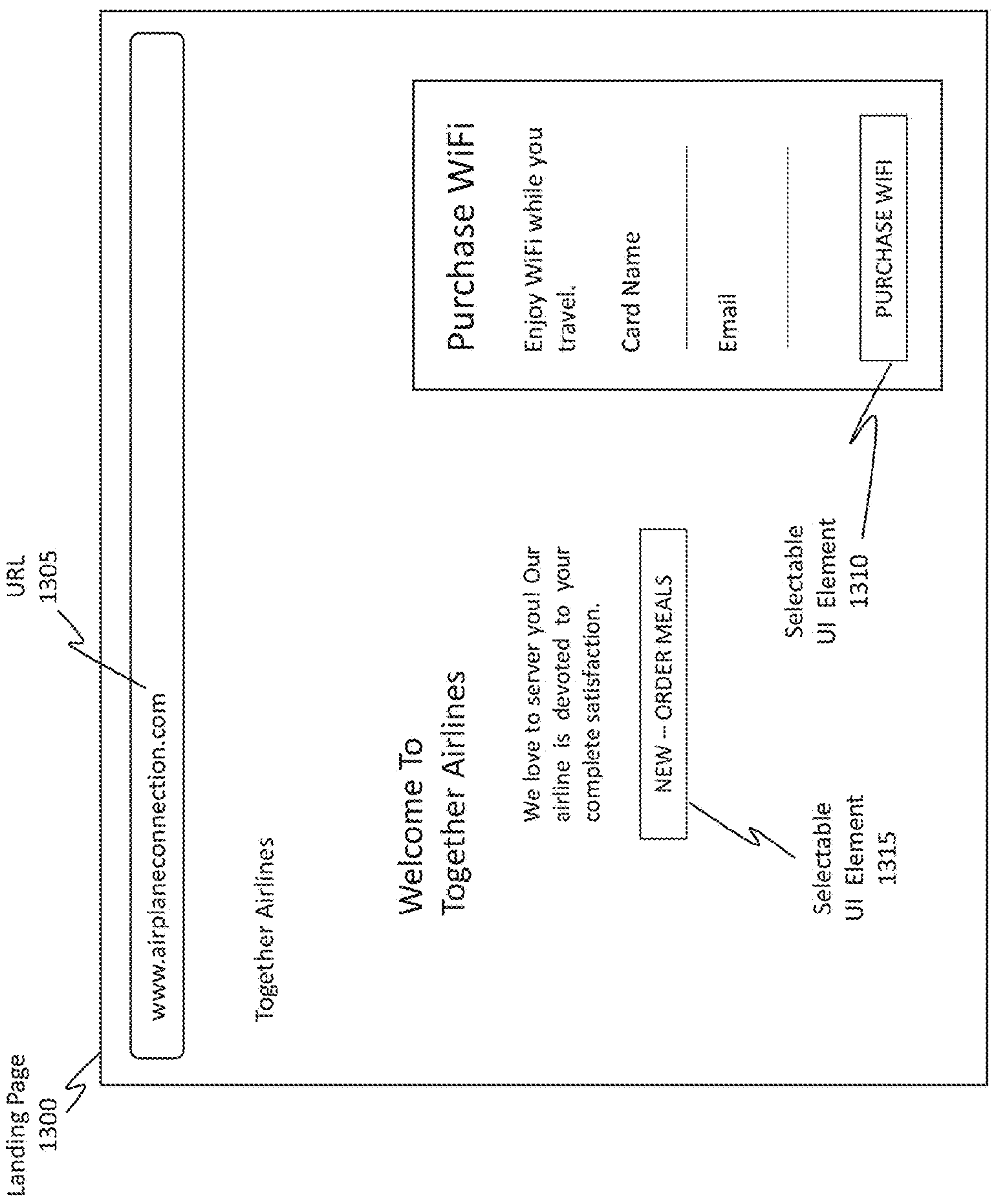
FIG. 13 illustrates an example landing page that may be used to redirect a client device.

Turning briefly to FIG. 13, there is shown an example of a landing page 1300, which is representative of the landing page mentioned in act 1235. Here, the landing page 1300 is displaying content associated with a uniform resource location URL 1305. Notice, the landing page 1300 provides an option (e.g., see selectable user interface UI element 1310) for purchasing the plane’s Wi-Fi.

In accordance with the disclosed principles, the landing page 1300 is also configured to include a new option, as reflected by the selectable UI element 1315. Selection of this selectable UI element 1315 will enable the client device to be redirected from connecting with the on-board server to connecting with one of the mini-servers described herein. That mini-server is configured to provide any type of content for the client device. In the example illustrated in FIG. 13, the mini-server is configured to at least provide a meal ordering and delivery service for the user of the client device.

Returning to FIG. 12, the flowchart 1200 includes an act 1240 in which the user selects the selectable UI element in the web landing page. For instance, the user may select the selectable UI element 1315 in FIG. 13.

In some implementations, that selectable UI element is coded with a reference identifying the IP address range used by the mini-servers. For instance, the selectable UI element, when selected, triggers the application to identify the IP address range 1150 from FIG. 11. Selection of the selectable UI element may also trigger the client device to communicate with the load balancer 1135 in order to eventually connect with one of the mini-servers in FIG. 11. Consequently, selection of the selectable UI element causes the client device to now be included in the second LAN 1115 of FIG. 11 and to be able to communicate with one or more of the mini-servers in the first LAN 1105.

In some implementations, there is no load balancing "entity;" rather, the embodiments cause the client devices and/or mini-servers to perform load balancing tasks, as described earlier. In the described mode of operation where the client device searches the range of IP addresses, there may not be a load balancer entity. Instead, the client device is directly seeking out a mini-server to connect to. The load balancing "effect" is inherent in the way the client device searches the whole range of IP addresses and identifies a particular mini-server to use (potentially at random or potentially with additional measures to even out the load). Accordingly, the URL 1405 in FIG. 14 may be achieved using the above process.

Alternatively, in a scenario where a load balancer exists, the load balancer presents a single stable URL to all clients. The load balancer is then tasked with considering the full range of possible mini-server IP addresses. Here, the clients might not need to know the range or search it in such a scenario. For instance, in the load balancer scenario, there are actually multiple ways the load balancer could work, such as a scenario where all connections and all content passes through the load balancer, as described earlier. Another scenario or mode of operation is referred to as a "DNS round-robin" mode.

In this second mode, content does not pass through the load balancer (e.g., it is a DNS server that responds to requests for a domain like "miniserver.airplaneconnection-.com" with a known good IP address of a live mini-server) either at random or in sequence to distribute the requesting client devices among the available mini-servers. As before, the load balancer would keep track of which mini-servers are active. The browsers on the client devices then establish a connection directly to the mini-server, without further involving the load balancer. For clarity, in either of the two load balancer scenarios (full traffic routing or DNS), the browser's URL would show the load balancer's domain e.g. "miniserver.airplaneconnection.com" rather than an address specific to a particular mini-server.

Flowchart 1200 illustrates this process via act 1245, in which the client device 1205 is redirected from having a connection with server 1210 to now having a connection with mini-server 1215. In act 1250, the client device 1205 is now connected with the mini-server 1215. As discussed earlier, this connection is facilitated via the WAP, the network bridge, and the load balancer. The load balancer knows the range of IP addresses now used by the mini-servers. The load balancer is able to determine which mini-server is available to handle requests and selects that mini-server to communicate with the client device 1205. In act 1255, the mini-server 1215 begins providing hosted content to the client device 1205, which receives that hosted content in act 1260.

Figure 14:
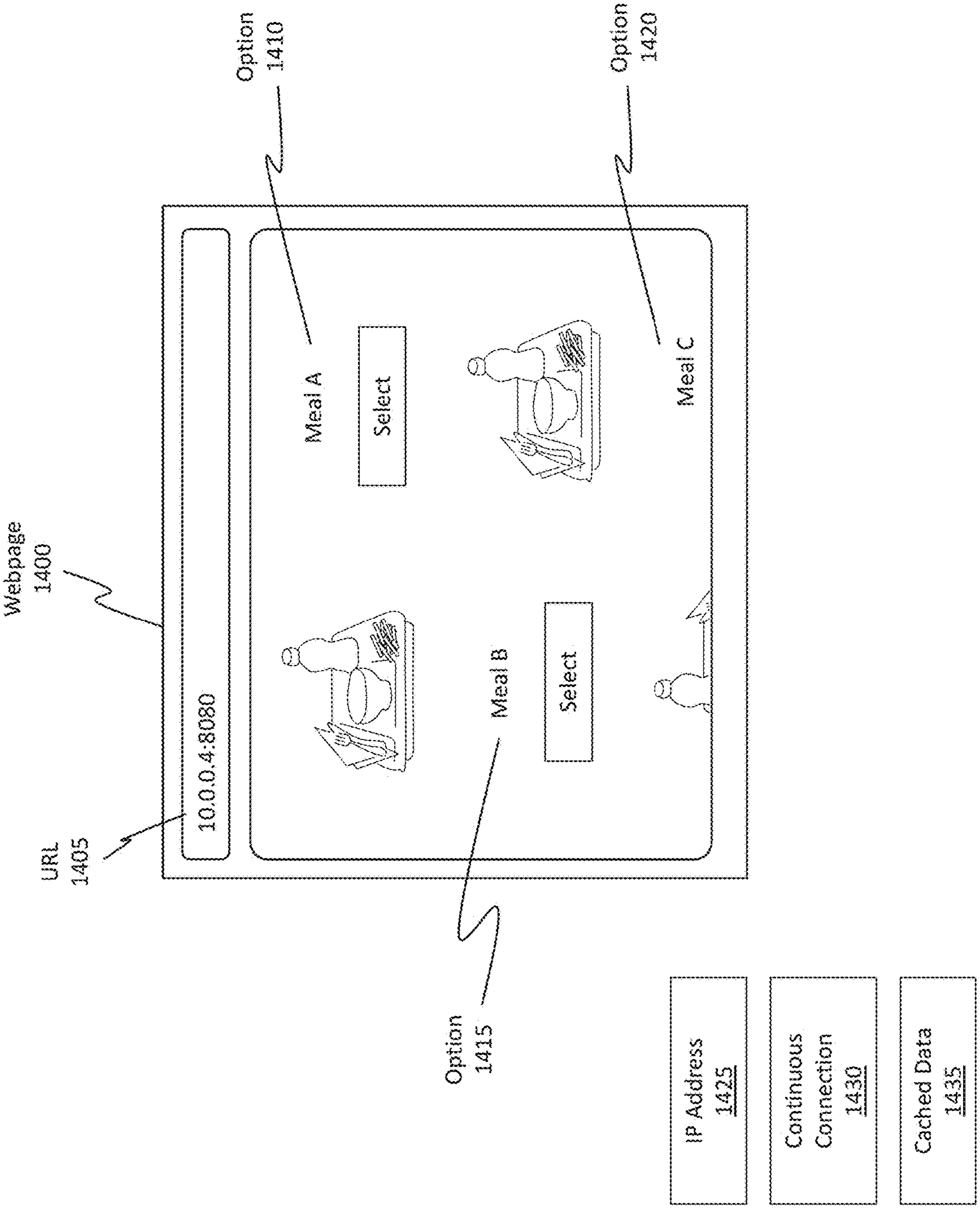
FIG. 14 illustrates an example webpage that is hosted by a mini-server and that may be provided to a client device.

FIG. 14 is an example illustration of some of the content that may be hosted and provided to the client device 1205 of FIG. 12. Specifically, in response to the user selecting the selectable UI element 1315 from FIG. 13, the embodiments were triggered to connect the client device 1205 from FIG. 12 with the mini-server 1215. The load balancer selects a particular mini-server to handle requests submitted by the client device. This selection process is completed by transmitting the mini-server's IP address to the client device, and the client device's web browser then displays content hosted by the mini-server.

In this regard, the mini-servers use IP addresses that are included within a predefined range of IP addresses. This predefined range of IP addresses are specified in code associated with the web landing page 1300 of FIG. 13, which page is provided by a server that is different from the mini-servers (e.g., the server may be the server 505 from FIG. 5). Whereas the server 505 from FIG. 5 does provides access to a WAN, it is often the case that the mini-servers do not provide access to the WAN (e.g., the mini-servers do not utilize the plane's antennas to reach the Internet; instead, the mini-servers may, as a programmable option, utilize the server 505 to provide Internet content). In some embodiments, for at least a period of time, neither one of the first LAN nor the second LAN are connected to a WAN, such as the Internet.

FIG. 14 illustrates an example webpage 1400 that is currently being displayed on the client device 1205 from FIG. 12. The webpage 1400 has a URL 1405, which is the IP address of the mini-server 1215. In this regard, the mini-server is hosting the content now displayed in the webpage 1400.

In this example, the mini-server is hosting a food ordering and delivery service for airplane meals. To illustrate, the webpage 1400 shows a first meal option 1410, a second meal option 1415, and a third meal option 1420. Of course, any number of meal options may be programmed into the service. Furthermore, as discussed earlier, the mini-server is able to host any type of content or provide any type of service.

Accordingly, the URL 1405 corresponds to an IP address 1425, which is the IP address of the mini-server. In this manner, the client device is redirected away from the plane's on-board server and is now connected to a battery-operated mobile mini-server. The client device is also now a part of the second LAN described herein.

The embodiments are able to provide a continuous connection 1430 between the mini-server and the client device. Consequently, data may be transmitted or streamed between the client device and the mini-server in real time or near real time without requiring a refresh of the webpage 1400.

In situations where the mini-server is not currently connected to the Internet or not connected to the server 505 of FIG. 5, the mini-server is able to cache data received from the client device, as reflected by cached data 1435. For instance, suppose the user of the client device desires to order the first meal option 1410. The user selects that option and then enters credit card data. The credit card data is transmitted to the mini-server. In cases where the mini-server is not currently connected to the plane's on-board server (and thus not connected to the Internet) or otherwise connected to the Internet, the mini-server is able to cache the payment information for a period of time until the mini-server does connect with the on-board server to access the Internet or until the mini-server connects to the Internet in some other manner (e.g., perhaps the plane has landed and the mini-server utilizes the 3G, 4G, 5G, etc. telecommunications networks). After establishing a connection to the Internet, the mini-server can process the payment information to complete the order purchase transaction. Accordingly, the embodiments are able to cache data for any period of time.

Returning to FIG. 5, the disclosed embodiments are able to utilize the network topology 500 to perform any number of operations. For instance, the embodiments are able to cause the mini-servers in the cluster to host content in the first network 520 and to provide the content to the client devices in the second network 550 via the network bridge 545. Furthermore, in response to receiving (e.g., at a particular one of the mini-servers in the cluster) input from a particular one of the client devices, the embodiments are able to synchronize the input across all the mini-servers in the cluster.

Additionally, the first network 520 is an example of a first local area network (LAN), and the second network 550 is an example of a second LAN. The mini-servers in the cluster illustrated in the first network 520 are battery-operated mobile devices. In some embodiments, these mini-servers refrain from providing access to a wide area network (WAN), such as the Internet. To clarify, these mini-servers may be configured to refrain from accessing the plane's air-to-ground antennas, side antennas, and satellite antennas such that these mini-servers may not be able to use the antennas to provide Internet access. Instead, in such embodiments, if the mini-servers provide Internet access, the mini-servers obtain that access via the server 505.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 15:
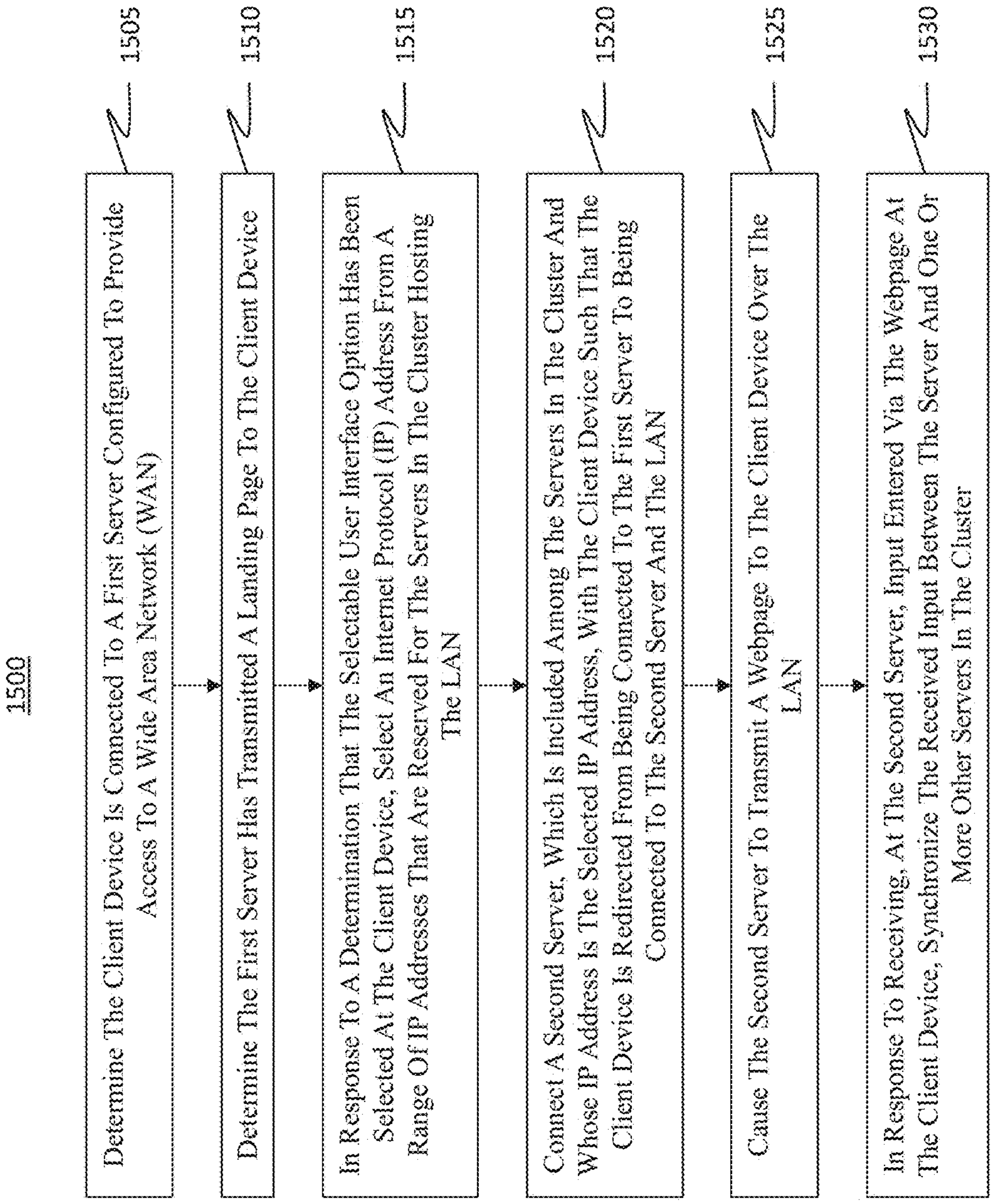
FIG. 15 illustrates a flowchart of an example method for redirecting a client device among different networks.

Attention will now be directed to FIG. 15, which illustrates a flowchart of an example method 1500 for redirecting a client device between different networks. The method 1500 may be implemented using the network topology 500 of FIG. 5. The client device may be any type of portable computing device, such as a mobile phone, tablet, laptop, or Internet-of-Things (IoT) device.

Method 1500 includes an act (act 1505) of determining the client device is connected to a first server configured to provide access to a WAN. For instance, FIG. 12 illustrates how the client device 1205 is initially connected to the server 1210, which may provide access to the Internet.

Method 1500 also includes an act (act 1510) of determining the first server has transmitted a landing page to the client device, such as the landing page 1300 of FIG. 13. Here, the landing page includes a selectable user interface option (e.g., selectable UI element 1315) that, when selected, redirects the client device from being connected to the first server to being connected to a local area network (LAN) hosted by a cluster of mini-servers (e.g., the first LANs mentioned herein). Notably, the first server is excluded from the cluster of mini-servers hosting the LAN. For instance, FIG. 5 shows how the server 505 is excluded from the first network 520.

In response to a determination that the selectable user interface option has been selected at the client device, there is an act (act 1515) of selecting an Internet Protocol (IP) address from a range of IP addresses that are reserved for the mini-servers in the cluster hosting the LAN. For instance, the mini-servers described herein are configured to have an IP address that lies within the predetermined IP address range 1150 of FIG. 11.

Act 1515 may be performed by the load balancer 1135 of FIG. 11. For instance, in some implementations, a load balancer selects the second mini-server from among the mini-servers in the cluster to provide the webpage to the client device. Here, the load balancer selects the second mini-server based on a determined availability of the second mini-server as compared to availabilities of remaining mini-servers included the cluster of mini-servers.

Method 1500 also includes an act (1520) of causing a second mini-server, which is included among the mini-servers in the cluster and whose IP address is the selected IP address, to connect to the client device. That is, act 1520 involves connecting the second mini-server with the client device. The phrase "causing a second mini-server to connect to the client device" should be interpreted broadly to include scenarios in which the client device is the active initiator of the connection such that the client device connects to the mini-server as well as scenarios in which the mini-server is the active initiator of the connection such that the mini-server connects to the client device. Accordingly, use of the phrase "cause the mini-server to connect" should not be construed as indicating that the mini-server is the leading initiator of establishing the connection; rather, it should be viewed as an implementation in which the mini-server is participating (not necessarily driving) the establishment of a connection between the client device and the mini-server. In any event, a connection is established between the client device and the mini-server.

An example of the "second" server is any of the mini-servers mentioned herein. As a consequence of performing act 1520, the client device is redirected from being connected to the first server to being connected to the second mini-server and the LAN. For instance, suppose the client device 555 from FIG. 5 is the client device mentioned in these acts. Initially, it may be the case that the client device 555 is connected to the server 505 and is able to access the Internet 510. In response to a user selecting the selectable UI element 1315 of FIG. 13, the client device 555 is redirected from being connected to the server 505 to now being connected to one of the mini-servers 525, 530, or 535.

Act 1525 involves causing the second server to then transmit a webpage (e.g., webpage 1400 from FIG. 14) to the client device over the LAN. For instance, the webpage may be hosted by the mini-server 525 of FIG. 5. The webpage provides access to at least one of an audio streaming service, a video streaming service, a food ordering and delivery service, a beverage ordering and delivery service, a gaming service, a printed article delivery service, or a shopping service. The mini-server 525 may transmit the webpage over the network bridge 545 provided by the WAP 540 to the client device 555 located in the second network 550 (i.e. a LAN).

In response to receiving (e.g., at the second server) input entered via the webpage at the client device, act 1530 involves synchronizing the received input between the mini-server and one or more other mini-servers in the cluster. This synchronization process was described with reference to FIG. 6. The received input, in some implementations, is redundantly stored by the mini-servers in the cluster via a bidirectional synchronization process performed among the mini-servers using conflict-free replicated data type (CRDT) objects.

In some embodiments, the mini-servers in the cluster are temporarily disconnected from the WAN for a period of time. In such cases, the input mentioned above may be cached by the mini-servers in the cluster for the period of time. Upon the period of time elapsing, at least one mini-server in the cluster connects to the WAN and processes the input over the WAN. In some implementations, the client devices are also able to cache data if disconnected from a mini-server. As a consequence of this caching operation, the client device can later reconnect and continue where it left off.

Figure 16A:
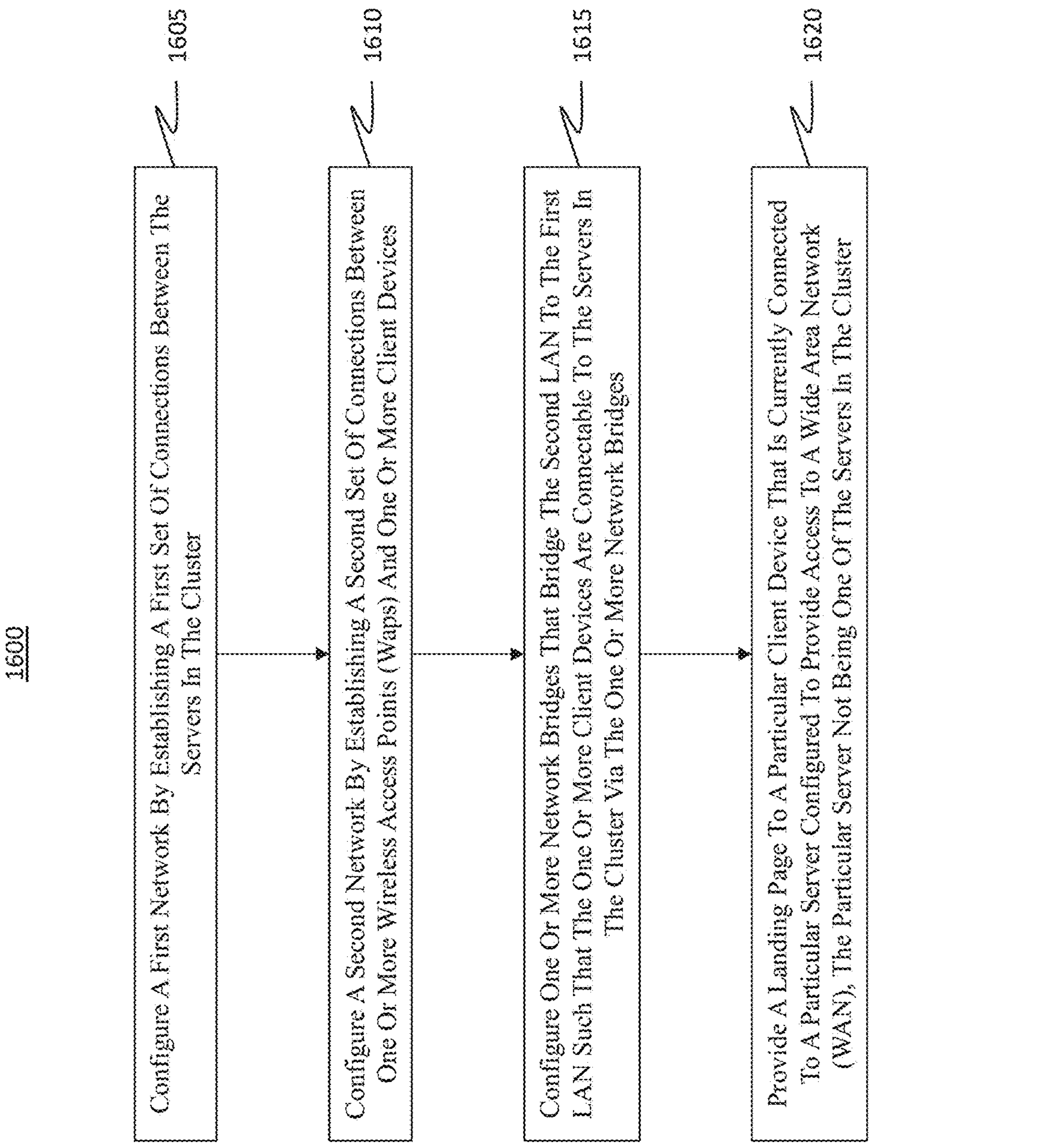
FIGS. 16A and 16B illustrate a flowchart of an example method for providing a network topology structured to provide isolation between client devices that are connected with servers in a cluster while simultaneously providing bidirectional synchronization between the servers in the cluster.
Figure 16B:
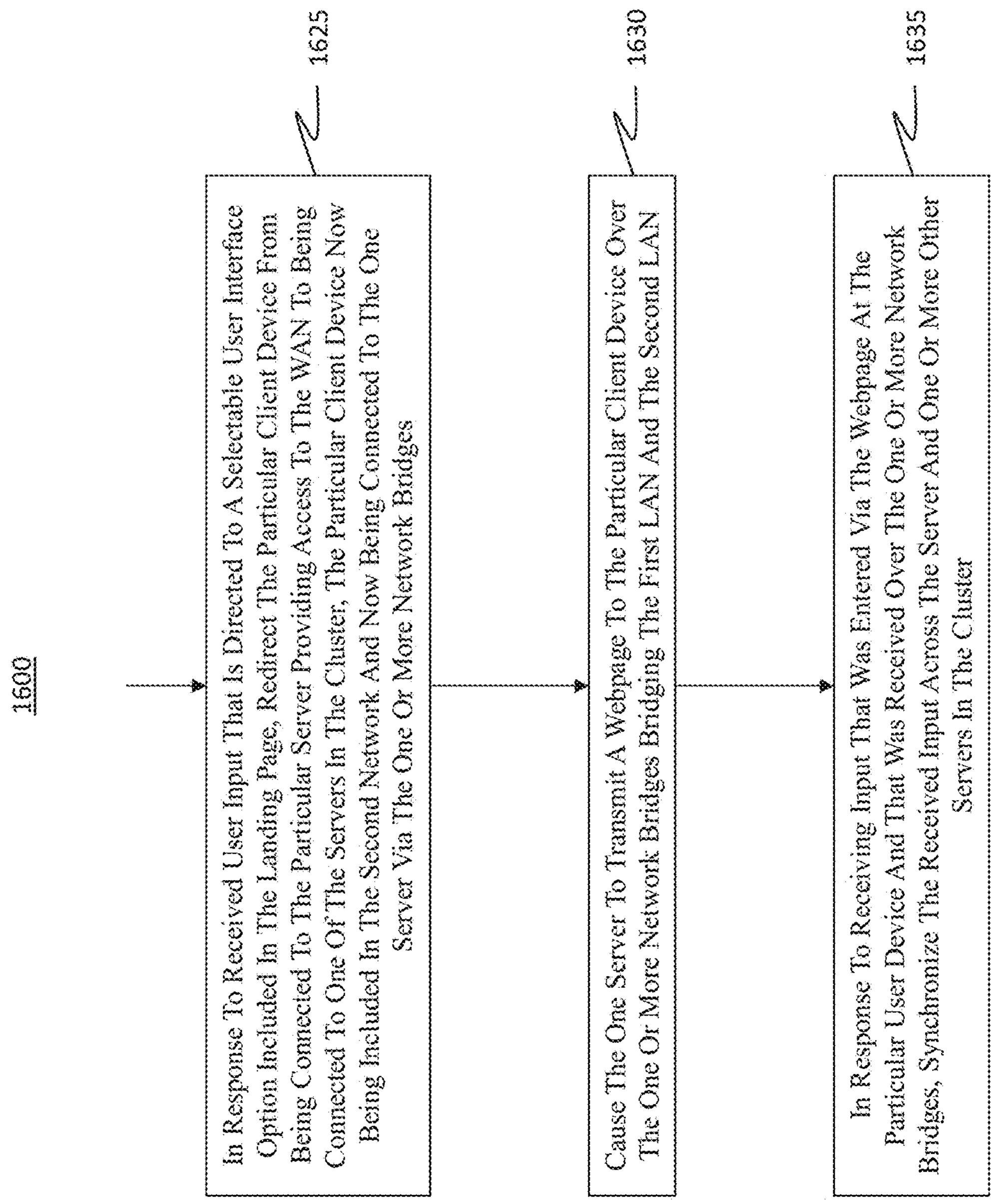

FIGS. 16A and 16B illustrate a flowchart of an example method 1600 for providing a network topology structured to provide isolation between client devices that are connected with mini-servers in a cluster while simultaneously providing bidirectional synchronization between the mini-servers in the cluster. Method 1600 may also be performed using the network topology 500 of FIG. 5.

Initially, method 1600 includes an act (act 1605) of configuring a first network (e.g., first network 520 of FIG. 5) by establishing a first set of connections (e.g., connections 620, 625, and 630 in FIG. 6) between the mini-servers in the cluster (e.g., mini-servers 605, 610, and 615). Here, the mini-servers in the cluster are configured to perform bidirectional synchronization with one another to cause data stored at any one of the mini-servers in the cluster to be synchronized across one, some, or all of the other mini-servers in the cluster. Furthermore, the first network is a first local area network (LAN) as opposed to a WAN.

Act 1610 then involves configuring a second network (e.g., second network 550 of FIG. 5) by establishing a second set of connections (e.g., connections 825 of FIG. 8) between one or more wireless access points (WAPs) (e.g., WAP 820) and one or more client devices (e.g., client devices 805, 810, and 815). Here, the WAPs provide isolation between the second set of connections such that the client devices are isolated from one another within the second network. Additionally, the second network is also a second LAN rather than a WAN.

Act 1615 involves configuring one or more network bridges (e.g., network bridge 545 of FIG. 5) that bridge the second LAN to the first LAN. Consequently, the client devices may be connected to the mini-servers in the cluster via the network bridges.

Act 1620 then involves providing a landing page (e.g., landing page 1300 of FIG. 13) to a particular client device that is currently connected to a particular server (e.g., server 505 of FIG. 5) configured to provide access to a WAN. Notably, the particular server is not one of the servers in the cluster of the first LAN.

In response to received user input that is directed to a selectable user interface option (e.g., selectable UI element 1315 of FIG. 13) included in the landing page, act 1625 involves redirecting the particular client device from being connected to the particular server providing access to the WAN to being connected to one of the mini-servers in the cluster. Consequently, the particular client device is now included in the second network and is now connected to the one mini-server via the one or more network bridges.

Act 1630 includes causing the one mini-server to transmit a webpage (e.g., webpage 1400 of FIG. 14) to the particular client device over the network bridge bridging the first LAN and the second LAN. In response to receiving input that was entered via the webpage at the particular user device and that was received over the network bridge, act 1635 involves synchronizing the received input across the mini-server and one or more other mini-servers in the cluster.

Accordingly, the disclosed embodiments are able to redirect a client device from initially connecting with a plane's on-board server to subsequently connecting to a battery-powered mobile mini-server, which is typically used by a crew member. That mini-server is able to then provide content to the client device and sync any input received from the client device with other mini-servers on the plane.

App-Based Topology

The above embodiments are focused on scenarios involving web browser-based implementations. Some embodiments, on the other hand, are focused on the use of a downloadable application (app) that may be used by a client device in lieu of a web browser. A client device with such an app is able to automatically detect or discover the presence of the mini-servers and thus may not necessarily rely on the landing page implementation mentioned above. The application may be downloaded from any app store. For instance, the app may be configured to search for a particular IP address hosted by a mini-server or other server. Additionally, or alternatively, the app may be configured to search for a particular device's port or other connection mechanism to connect the client device.

In the app-driven approach, the client device may connect to the mini-servers using connections besides just a Wi-Fi connection. For instance, the connections may be established using Bluetooth or even mobile hotspot technology. The security measures mentioned earlier may still be implemented to ensure data integrity, protection, and authentication. With app-based technology, the app an search directly for a particular IP address or other connection mechanism to establish the connection between the client device and a mini-server. For instance, the app may be preconfigured to search for specific connection or a range of connections as opposed to using a landing page redirect process. As such, an app may have predefined code used for the search and connection process.

WAP Device Differentiation Topology

In some embodiments, the client devices and the mini-servers are included in the same network, and the WAP differentiates between the client devices and the mini-servers. That is, the WAP communicates with all of the devices and actively identifies and differentiates between the different devices in real-time. The WAP also imposes security measures to isolate the client devices from one another even though there is only a single network. The WAP also recognizes that the mini-servers should be allowed to communicate with one another. Accordingly, security profiles may be generated and applied to the different computing devices based on their roles within the single network, where the WAP imposes the security profiles in real-time.

Bar Code and QR Code Embodiments

Previously, it was mentioned that when a client device first connects to an SSID, a landing page is provided to the client device, where the landing page includes the redirect option for connecting to the disclosed first LAN. In some cases, the client device may first utilize the SSID of the server. At a later point in time, the user of client device may desire to connect to the disclosed network topology, but the user may not recall the URL of the landing page. Accordingly, some embodiments are configured to be able to scan a bar code or QR code to navigate to the landing page. For instance, it may be the case that brochures or other pamphlets in the passenger seats are printed to have the bar code or QR code. The bar code or QR code may also be printed on a card that is handed to each of the passenger. In any event, the user can use his or her client device to scan the bar code or QR code. This scanning operation will then trigger the client device to display the initial landing page without requiring the user to recall the landing page's URL.

Alternative Environments

Other embodiments may be implemented outside of the specific environment described previously. For example, several of the embodiments may be implemented on a passenger train to allow passengers to use client devices with mini-servers used by coach attendants. Such embodiments could provide the further operational efficiencies in passenger train environments by eliminating the need for a dining car, for example. And, similar to the airplane example, train passenger client devices may be provided content by mini-servers despite any Internet connectivity issues (e.g., when a train is going through a tunnel).

Example Computer/Computer Systems

Attention will now be directed to FIG. 1700 which illustrates an example computer system 1700 that may include and/or be used to perform any of the operations described herein. Computer system 1700 may take various different forms. For example, computer system 1700 may be embodied as a tablet 1700A, a desktop or laptop 1700B, a wearable device 1700C, a mobile device, or a standalone device. The ellipsis 1700D illustrates how any type of computing system may be used. Computer system 1700 may also be a distributed system that includes one or more connected computing components/devices that are in communication with computer system 1700.

Figure 17:
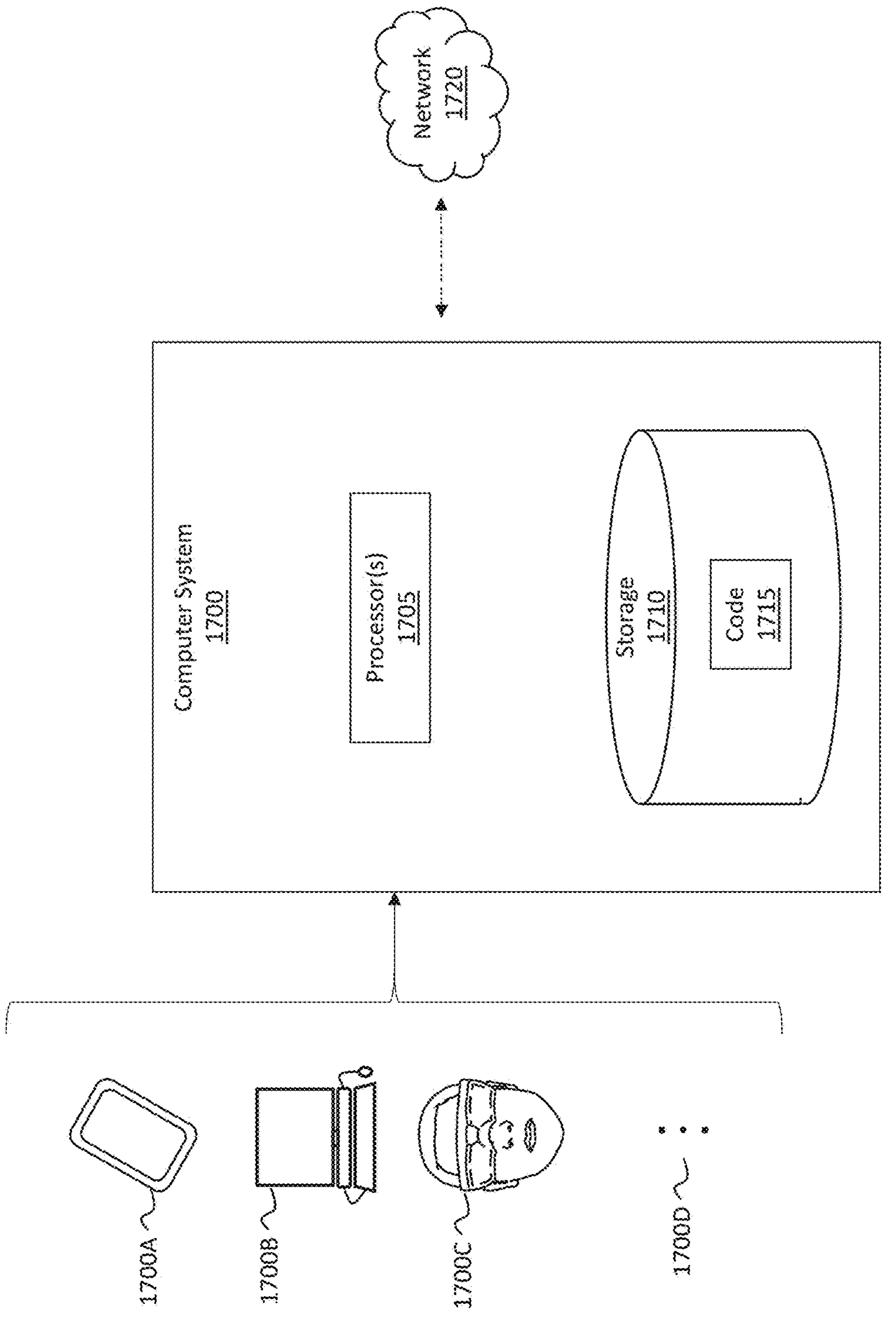
FIG. 17 illustrates an example computer system configured to perform any of the disclosed operations.

In its most basic configuration, computer system 1700 includes various different components. FIG. 17 shows that computer system 1700 includes one or more processor(s) 1705 (e.g., a hardware processing unit) and storage 1710.

Regarding the processor(s) 1705, it will be appreciated that the functionality described herein can be performed, at least in part, by one or more hardware logic components (e.g., the processor(s) 1705). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "application," or "engine" can refer to hardware processing units or to software objects, routines, or methods that may be executed on computer system 1700. The different components, modules, engines, and services described herein may be implemented as objects or processors that execute on computer system 1700 (e.g., as separate threads).

Storage 1710 may be physical system memory, which may be volatile, non-volatile, or some combination of the two. The term "memory" may also be used herein to refer to non-volatile mass storage such as physical storage media. If computer system 1700 is distributed, the processing, memory, and/or storage capability may be distributed as well.

Storage 1710 is shown as including executable instructions (i.e. code 1715). The executable instructions represent instructions that are executable by the processor(s) 1705 of computer system 1700 to perform the disclosed operations, such as those described in the various methods.

The disclosed embodiments may comprise or utilize a special-purpose or general-purpose computer including computer hardware, such as, for example, one or more processors (such as processor(s) 1705) and system memory (such as storage 1710), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1700 may also be connected (via a wired or wireless connection) to external sensors (e.g., one or more remote cameras) or devices via a network 1720. For example, computer system 1700 can communicate with any number devices or cloud services to obtain or process data. In some cases, network 1720 may itself be a cloud network. Furthermore, computer system 1700 may also be connected through one or more wired or wireless networks 1720 to remote/separate computer systems(s) that are configured to perform any of the processing described with regard to computer system 1700. The network 1720 is representative of the disclosed LANs and even possibly even the disclosed WANs.

A "network," like network 1720, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1700 will include one or more communication channels that are used to communicate with the network 1720. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed by a mobile system and comprising:
- downloading first data from a first network;
- determining that the mobile system is disconnected from the first network;
- establishing a communication channel with a second computing system, resulting in the mobile system being included in a second network with the second computing system, wherein a determination is made that the second computing system includes second downloaded data that is different than the first downloaded data;
- synchronizing the mobile system with the second computing system by receiving, from the second computing system, the second downloaded data, wherein the second downloaded data is received over the communication channel; and
- facilitating bidirectional synchronization between the mobile system and the second computing system by transmitting the first downloaded data to the second computing system.

2. The method of claim 1, wherein the first network is a wide area network.

3. The method of claim 1, wherein the first data is managed by a local database of the mobile system.

4. The method of claim 1, wherein the communication channel is a short-range communication channel.

5. The method of claim 1, wherein the communication channel is a Bluetooth communication channel.

6. The method of claim 1, wherein the second network is a local area network.

7. The method of claim 1, wherein a determination is made that the second computing system is a second mobile system.

8. The method of claim 1, wherein the mobile system is one of a tablet or a smartphone.

9. The method of claim 1, wherein the mobile system, after synchronizing with the second computing system, reconnects to the first network.

10. The method of claim 1, wherein, while the mobile system is synchronizing with the second computing system, the mobile system remains disconnected from the first network.

11. The mobile system of claim 1, wherein the mobile system is not an on-board server.

12. The mobile system of claim 1, wherein the first data obtained from the first network is obtained from a server of the first network.

13. The mobile system of claim 1, wherein at least some connections that are available to connect the mobile system and the second computing system are isolated from one another.

14. The mobile system of claim 1, wherein the second network is isolated from the first network.

15. The mobile system of claim 1, wherein the mobile system is at least partially isolated from the second computing system.

16. The mobile system of claim 1, wherein a security profile is applied to the mobile system.

17. The mobile system of claim 1, wherein a wireless access point (WAP) is established between the mobile system and the second computing system.

18. The mobile system of claim 17, wherein the WAP provides isolation between one or more connections that are available to connect the mobile system to the second computing system.

19. A mobile system comprising:
- one or more processors; and
- one or more hardware storage devices that store instructions that are executable by the one or more processors to cause the mobile system to:
  - download first data from a first network;
  - determine that the mobile system is disconnected from the first network;
  - establish a communication channel with a second computing system, resulting in the mobile system being included in a second network with the second computing system, wherein a determination is made that the second computing system includes second downloaded data that is different than the first downloaded data;
  - synchronize the mobile system with the second computing system by receiving, from the second computing system, the second downloaded data, wherein the second downloaded data is received over the communication channel; and
  - facilitate bidirectional synchronization between the mobile system and the second computing system by transmitting the first downloaded data to the second computing system.

20. One or more hardware storage devices that store instructions that are executable by one or more processors of a mobile system to cause the mobile system to:
- download first data from a first network;
- determine that the mobile system is disconnected from the first network;

establish a communication channel with a second computing system, resulting in the mobile system being included in a second network with the second computing system, wherein a determination is made that the second computing system includes second downloaded data that is different than the first downloaded data;

synchronize the mobile system with the second computing system by receiving, from the second computing system, the second downloaded data, wherein the second downloaded data is received over the communication channel; and facilitate bidirectional synchronization between the mobile system and the second computing system by transmitting the first downloaded data to the second computing system.

* * * * *